United States Patent [19]

Uetani

[11] Patent Number: 5,027,299

[45] Date of Patent: Jun. 25, 1991

[54] ELEVATOR TESTING APPARATUS

[75] Inventor: Kenichi Uetani, Inazawa, Japan

[73] Assignee: Mitsubishi Denki Kabushiki Kaisha, Japan

[21] Appl. No.: 388,017

[22] Filed: Aug. 1, 1989

[30] Foreign Application Priority Data

Aug. 4, 1988 [JP] Japan ................................ 63-195201
Sep. 2, 1988 [JP] Japan ................................ 63-218264

[51] Int. Cl.[5] ......................... B66B 3/00; G05B 19/02

[52] U.S. Cl. .................................... 364/580; 364/150; 187/130

[58] Field of Search .................... 364/580, 550, 551.01, 364/554, 164, 138, 578, 188, 18.3, 148, 149, 150, 151, 152; 187/127, 128, 129, 130, 131

[56] References Cited

U.S. PATENT DOCUMENTS

| | | | |
|---|---|---|---|
| 4,213,175 | 7/1980 | Kurihara | 364/151 X |
| 4,249,238 | 2/1981 | Spang, III et al. | 364/151 X |
| 4,503,941 | 3/1985 | Takabe | 187/29 |
| 4,604,718 | 8/1986 | Norman et al. | 364/578 |
| 4,616,328 | 10/1986 | Kassay et al. | 364/580 X |
| 4,663,703 | 5/1987 | Axelby et al. | 364/149 |
| 4,669,579 | 6/1987 | Ookubo | 187/124 |
| 4,672,531 | 6/1987 | Uetani | 364/138 |
| 4,677,577 | 6/1987 | Takabe et al. | 364/554 |
| 4,716,517 | 12/1987 | Iwata | 364/148 |
| 4,719,996 | 1/1988 | Tsuji | 187/127 |
| 4,724,931 | 2/1988 | Ichioka | 187/101 |
| 4,740,886 | 4/1988 | Tanifuji et al. | 364/164 X |
| 4,777,585 | 10/1988 | Kokawa et al. | 364/164 |
| 4,802,082 | 1/1989 | Uetani | 364/138 |
| 4,802,557 | 2/1989 | Umeda et al. | 187/127 |
| 4,838,384 | 6/1989 | Thangavelu | 187/127 X |
| 4,864,490 | 9/1989 | Nomoto et al. | 364/148 |

FOREIGN PATENT DOCUMENTS

| | | |
|---|---|---|
| 55-11418 | 1/1980 | Japan . |
| 58-172177 | 10/1983 | Japan . |
| 59-39668 | 3/1984 | Japan . |

*Primary Examiner*—Joseph L. Dixon
*Attorney, Agent, or Firm*—Leydig, Voit & Mayer

[57] ABSTRACT

An apparatus for testing operation of system components such as elevator cages under group-supervision control which has a central processor and stored control programs to provide group-supervision control of elevator cages including selecting cages from among a plurality of cages, on the basis of signals from hall call buttons for calling cages and destination call buttons, and causing the selected cages to travel to destination floors. The apparatus includes programs which produce diagnostic results and are incorporated with the stored control programs for controlling and operating the system. In one embodiment, the programs direct the cages to execute test operations which simulate normal operations of the cages under group-supervision control. In a second embodiment, the programs operate during normal cage operation. In both embodiments the programs provide a conservation function which selects and holds group-supervisory predictive-information values that are used in the group-supervision control programs, a group-supervisory information actual-measurement function which measures actual values which correspond to the predictive-information values, and a predictive-information accuracy function which compares the predictive-information values and the measured actual values and diagnoses the presence of an abnormality.

2 Claims, 20 Drawing Sheets

ELEVATOR TESTING APPARATUS

BACKGROUND OF THE INVENTION

This invention relates to an elevator testing apparatus which automatically makes the operating tests of an elevator.

In general, for the purpose of efficiently operating a plurality of cages, an elevator system has a group supervision control device in addition to elevator control devices for controlling the individual cages. Each of the cages has a controller which is constructed of a microcomputer, and it is operated according to a program which is stored in a ROM (read only memory). The program is standardized in order to enhance productivity, and basic operations have all been tested and checked in a factory. In addition to the standard program for the basic operations, the specifications of elevator operations differing in individual buildings are set at the delivery of the cages from the factory, and various operations prepared according to the operation specifications are selected. Thus, the speeds, the number of stops, etc. of each cage are automatically set according to the program, and the elevator operations to be performed in every building are determined by the standard program and the selected operation specifications.

FIG. 1 is a block arrangement diagram showing a conventional elevator system. Referring to the figure, numeral 1 designates a cage, numeral 2 a counterweight which is arranged in opposition to the cage 1, and numeral 3 a hoist motor which serves to move the cage 1 up and down. Elevator control panels 4 are respectively provided in correspondence with a plurality of cages 1, and each of them includes an elevator control device 5 constructed of a microcomputer, and a drive control circuit 6 for driving the hoist motor 3 in accordance with a command from the elevator control device 5.

The elevator control device 5 includes a central processing unit or CPU 51, a memory unit 52 which is configured of a ROM (EPROM, namely, electrically programmable ROM) and a RAM (random access memory), serial transmitters 53 and 54 each of which is constructed of a device such as Product 8251 manufactured by Intel Inc., a converter 55 by which the command for the drive control circuit 6 is interfaced through voltage conversion or the like, and an internal bus 56 which connects all of the constituents 51–55. The RAM forming part of the memory unit 52 is backed up by a battery against the failure of power supply.

A controller 7 is constructed of a microcomputer provided in the cage 1, and is connected to the transmitter 54 of the elevator control device 5. It contains cage calls, etc.

A group supervision panel 8 is connected to the elevator control devices 5, and it includes a group supervision control device 9 constructed of a microcomputer. Likewise to the elevator control device 5, the group supervision control device 9 includes a CPU 91, a memory unit 92, transmitters 93 and 94, a converter 95, and an internal bus, 96. The transmitter 93 is connected to the transmitters 53 provided in the elevator control devices 5. The group supervision control device 9 can be assembled in the elevator control device 5. In some cases, accordingly, the elevator control device 5 includes the function of group supervision.

Shown at numeral 10 is hall equipment for hall calls, etc., which is connected to the converter 95 provided in the group supervision control device 9. Numeral 11 indicates a controller which is constructed of a microcomputer provided in the hall equipment 10. It gives selection information to the group supervision control device 9 through the transmitter 94, and it controls the hall equipment 10 in accordance with a command from the group supervision control device 9.

Shown at numeral 12 is hall equipment for hall lanterns, etc., which is connected to the converter 55 of the elevator control device 5. Numerals 13 and 14 indicate maintenance devices which are respectively connected to the transmitters 94 and 54. Each of the maintenance devices 13 and 14 is used for adjustments in the installing operation of the elevator system or for inspections in the maintenance operation thereof, and it is constituted by, for example, control switches and display elements such as LEDs (light emitting diodes), or a laptop type personal computer.

Now, an example of the ordinary operation of the CPU 91 in the group supervision control device 9 will be described with reference to flow charts in FIGS. 2–4.

FIG. 2 shows the whole procedure of processing for selecting cages to be assigned to hall calls which have developed from the hall equipment 10, and the processing is the most important in the function of group supervision.

First, if hall calls have been registered is decided (step S1). In the presence of the registered hall calls; if they include unallotted hall calls therein is decided (step S2). In the presence of the unallotted hall calls, one of them is selected and is set as a hall call l for selecting an assigned cage (step S3).

Subsequently, the assignment estimation values of all the cages in the case of tentatively assigning these cages to the selected unallotted hall call l are calculated (step S4). Cage No. n the calculated assignment estimation value of which is the minimum (the estimation of which is the best) is selected (step S5), and it is set as an actual assigned cage (step S6).

As a final step, the cage of No. n is registered as the cage assigned to the hall call l, and a command of assignment to the hall call l is sent to Cage No. n (step S7). Thus, Cage No. n is caused to respond to the hall call l.

FIG. 3 shows an assignment estimation value calculating routine at the step S4 in FIG. 2. Since this routine is in the same procedure for all the cages, it shall be explained on only one cage assumed to be Cage No. n.

First, the continuous wait times of the already allotted hall calls among the registered hall calls, the times having lapsed up to the present since the registrations, are all fetched (step S11). As to those cages other than Cage No. n which are not tentatively assigned, the periods of time (arrival expectation times) which are expected at present to be required for responding to the already allotted hall calls (for arriving at assignment floors) are calculated (step S12). Incidentally, the continuous wait times have been separately obtained by tasks such as timer interrupts.

Next, as to Cage No. n to which the hall call l is tentatively allotted, the arrival expectation time for responding to the hall call to which Cage No. n has already been assigned (for arriving at the assignment floor at the tentative assignment of Cage No. n) is calculated (step S13). Subsequently, the arrival expectation time of Cage No. n for arriving at the floor of the tentatively allotted hall call l is calculated (step S14).

Next, as to those cages other than Cage No. n which are not tentatively assigned, loads in the cages (expectation cage loads) expected at the responses to the already allotted hall calls (for arriving at the assignment floors) are calculated (step S15).

Besides, as to Cage No. n to which the hall call l is tentatively allotted, the expectation cage load at the response to the hall call to which Cage No. n has already been assigned (for arriving at the assignment floor at the tentative assignment of Cage No. n) is calculated (step S16). Subsequently, the expectation cage load of Cage No. n at the response to the tentatively allotted hall call l is calculated (step S17).

As a last step, the assignment estimation value in the case of tentatively assigning Cage No. n to the hall call l is calculated according to a predetermined formula on the basis of the continuous wait times, arrival expectation times and expectation cage loads obtained at the above steps (step S18). The formula is called the "assignment estimation function", etc., and by way of example, the assignment estimation value of Cage No. n as denoted by Hn is expressed as follows:

$$Hn = Tl + f(Ll) + \Sigma^{i}[(Wi + Ti) + f(Li)]$$

where Tl denotes the arrival expectation time of Cage No. n for responding to the tentatively allotted hall call l (refer to the step S14), Wi denotes the continuous wait times of the allotted hall calls i (refer to the step S11), Ti denotes the arrival expectation times of the assigned cages for the allotted hall calls i (refer to the steps S12 and S13), Ll denotes the expectation cage load of Cage No. n at the response to the tentatively allotted hall call l (refer to the step S17), Li denotes the expectation cage loads at the responses of the assigned cages to the allotted hall calls i (refer to the steps S15 and S16), and f(Ll) and f(Li) denote the full-capacity passage penalties of the hall calls l and i as are derived from the values of the respective loads Ll and Li. Incidentally, (Wi+Ti) corresponds to the sum between the continuous wait time, and the arrival expectation time of the assigned cage, and it is called the "expectation wait time", etc. Here, the case has been explained where the expectation wait times and the possibilities of full-capacity passage are estimated for all the hall calls so as to allot one hall call. However, there are also different estimative factors, and the estimation function is not restricted to the foregoing one.

FIG. 4 shows a routine for calculating the arrival expectation time for arriving at the assignment floor, at the step S13 in FIG. 3. The procedure of calculation applies to both the cage which is tentatively assigned and the cage which is not tentatively assigned, and it holds true also of the tentatively allotted hall call. Here, a case of calculating the arrival expectation time of Cage No. n for responding to a hall call j will be explained.

First, the initial value of a cumulation time memory for successively computing passage times at respective floors and cumulatively adding them is cleared to zero (step S21). The floor at which scanning is started is set at the floor at which the cage lies presently (step S22). The scanning direction which indicates whether the scanning is done upwards or downwards, is initialized to be identical to the direction in which the cage is presently serving (step S23).

Next, the scanning floor is renewed by one (step S24). If the new floor is the terminal floor of the top floor or the bottom floor, is decided (step S25). When the new floor is not the terminal floor, the calculative flow proceeds to a step S27, and when the new floor is the terminal floor, the scanning direction is reversed (step S26).

Further, a stop time at the floor before the renewal is predicted and is added in the cumulation time memory (step S27). Incidentally, the "stop time" signifies a period of time remaining till start as regards the floor at which the cage is at a stop. Regarding a cage call or an allotted call, the "stop time" is a period of time obtained in such a way that a base time (10 seconds) has 1 second added thereto in the presence of the cage call or has 3 seconds added thereto in the presence of the allotted call. Regarding the others, the "stop time" is a period of time based on cage calls and allotted calls conforming to that expected value of responsive stops which is obtained in such a way that allotted calls in the future, and cage calls based on allotted calls at present, as well as cage calls based on the allotted calls in the future are predicted from statistical values etc.

Next, the period of time which is required for the cage to arrive at the new floor from the floor before the renewal is predicted from an inter-floor distance table and the predictive travel pattern of the cage, and it is added in the cumulation time memory (step S28).

Subsequently, if the new floor is identical to the floor of the hall call j is decided (step S29), and if the scanning direction is identical to the direction of the hall call j is decided (step S30). In a case where the new floor and the scanning direction have respectively agreed with the floor and the direction of the hall call j, the scanning of the floors is ended, and the value of the cumulation time memory is set as the arrival expectation time of Cage No. n for the hall call j and is stored in a table (step S31). On the other hand, in a case where the steps S29 and S30 have decided that the scanning does not reach the hall call j, the calculative procedure returns to the step S24, at which the scanning floor is renewed and after which the same steps are repeated.

The above procedure is executed as the program which is standardized according to the specifications of a building. Even in the case of the elevator system thus standardized, however, tests are performed in an installation site or in a maintenance inspection operation in order to confirm the situation or find any fault and to search into the connection errors of the devices, and a long time and much labor are needed. As causes due to which the arrival expectation time, for example, becomes inaccurate, the following items are considered assuming that the standardized program has been satisfactorily tested in the factory:

(1) Error of the specification information.

(2) Erroneous distribution of the external information, or any trouble.

(3) Errors of the control devices other than the group supervision control device, for the cages etc.

(4) Error remaining in the standardized program. Moreover, the same applies to the other group-supervisory control information, and the control information items to be generated become inaccurate due to the causes (1)-(4).

For these reasons, there has heretofore been proposed, for example, an elevator testing apparatus wherein as disclosed in the official gazette of Japanese Patent Application Laid-open No. 11418/1980, commands are externally given to an elevator control device employing a microcomputer, thereby to automatically generate test operation signals, or an elevator testing apparatus wherein as disclosed in the official gazette of Japanese Patent Application Laid-open No. 172177/1983, elevator states such as the registrations of hall calls or destination calls generated by simulating elevator users are recorded as data items, and the recorded data items are analyzed.

With such an elevator testing apparatus in the prior art, however, when an operating test carried out by the elevator control device is to be diagnosed and the diagnostic results estimated, the operating test needs to be separately analyzed using equipment which is not included in the elevator system, furthermore estimation of diagnostic results at a high level of precision requires much manual labor. Moreover, insufficient information makes it difficult to attain a satisfactory estimation of diagnostic results on the basis of a limited number of recorded data items.

By way of example, in the apparatus of Japanese Patent Application Laid-open No. 11418/1980, an elevator operation is conducted by generating a virtual operation command in a program, so that the apparatus is highly effective for detecting the occurrence of any significant abnormality. Minor inferior operations etc., however, cannot be determined without careful observations. On the other hand, in the apparatus of Japanese Patent Application Laid-open No. 177172/1983, the elevator states are merely recorded as the data items. The analysis of the data items requires much labor, and insufficient information concerning the timings of the data items poses a problem. That is, when a large number of tests are made, any abnormality can be determined, but a satisfactory analytical diagnosis is impossible in an installation site or a maintenance inspection operation in which only a small number of tests can be carried out.

In particular, the abnormalities of group supervision performance include phenomena immediately known, such as the failure of a cage to respond to a call, and phenomena difficult of human judgements, such as a miss in prediction accuracy. It is often impossible to find out the abnormality by which group supervision performance is slightly degraded.

As stated above, since the elevator testing apparatuses in the prior art make analyses by the use of equipment not included in the elevator system, they have had the problems that a long time and much labor are required and that a satisfactory analytical diagnosis or estimation of diagnostic results is impossible.

SUMMARY OF THE INVENTION

This invention has the objective to solve the problems as mentioned above, and has for its object to provide an elevator testing apparatus of high precision and high reliability which can analyze, diagnose and estimate diagnostic results without requiring much manual labor and which can determined abnormalities of a group supervision performance, such as a miss in prediction accuracy, on the basis of the control information for a cage produced during normal operation or during a simulative test operation.

BRIEF DESCRIPTION OF THE DRAWINGS

FIGS. 2 thru 4 are flow charts showing an example of the ordinary operation of a CPU (91) included in a group supervision control device (9) in FIG. 1, wherein:

FIG. 2 illustrates the general procedure of processing for selecting an assigned cage for a hall call which has developed from a hall equipment (10) in FIG. 1;

FIG. 3 illustrates the procedure of calculating an assignment estimation value at a step (S4) in FIG. 2; and FIG. 4 illustrates the procedure of calculating an arrival expectation time required for arriving at an assignment floor, at a step (S13) in FIG. 3;

FIG. 5 and FIGS. 6 thru 11 are a block diagram and flow charts, respectively, showing the first embodiment of this invention, wherein:

FIG. 5 illustrates an elevator system in this embodiment;

FIG. 6 illustrates the procedure of controlling the execution instruction of an operating test in accordance with a program set in a maintenance device (20) in FIG. 5;

FIG. 7 illustrates the general procedure of a program which is set in the CPU (91) in FIG. 1 and which mates with the program in the maintenance device (20);

FIG. 8 illustrates the operating procedure of an all-floor hall call response test as to an example of a simulative test task which is executed by the program in the CPU (91);

FIG. 9 illustrates the procedure of holding control information and giving an actual-measurement start command which corresponds to the held control information;

FIG. 10 illustrates the procedure of actually measuring information which corresponds to group-supervisory control information which is held; and FIG. 11 illustrates the procedure of comparing the control information and the corresponding actual-measurement information obtained with the respective procedures in FIG. 9 and FIG. 10, so as to determine the presence of any abnormality, to record a state and to diagnose an accuracy;

FIGS. 12 and 13 and FIGS. 14 thru 18 are block diagrams and flow charts, respectively, showing the second embodiment of this invention, wherein:

FIG. 12 illustrates an elevator system in this embodiment;

FIG. 13 illustrates an arrangement for realizing the system in FIG. 12;

FIG. 14 illustrates the processing procedure of an elevator group-supervision control device in the second embodiment;

FIG. 15 illustrates the procedure of processing for actually measuring information which corresponds to group-supervisory predictive information which is held;

FIG. 16 illustrates the processing procedure of a predictive accuracy diagnosis for comparing the group-supervisory predictive-information value and the corresponding actual-measurement value obtained with the respective procedures in FIG. 14 and FIG. 15, so as to determine the presence of any abnormality from the difference of the comparison and to record a state at that time;

FIG. 17 illustrates the processing procedure of controlling an instruction for outputting a self-diagnostic result; and FIG. 18 illustrates a processing procedure on the side of a CPU for an elevator group-supervision control, corresponding to the self-diagnostic result output processing in FIG. 17;

Throughout the drawings, the same symbols indicate identical or equivalent portions.

DESCRIPTION OF THE PREFERRED EMBODIMENTS

The first embodiment comprises an apparatus for obtaining diagnostic results from diagnosing elevator operation using a testing apparatus for testing operation of elevator cages which includes programs that direct the cages to execute test operations which simulate normal operations of the cages under group supervision control. The testing apparatus under program direction provides simulation test sensing means for generating a simulation test command on the basis of operation command information from a maintenance device, simulation test execution means for operating a cage in accordance with the simulation test command, control information holding means for holding control information for the cage under the simulation test operation, control information actual-measurement means for obtaining measured actual-information corresponding to the control information on the basis of selection information, and accuracy diagnosis means for comparing the control information held in the holding means and the measured actual information so as to diagnose the presence of any abnormality. In this embodiment, the specified control information in the case where the simulation test execution means operates the cage is compared with that actual-information corresponding to the control information which is obtained when the cage is actually operated, whereby the cage operation is analyzed and diagnosed without manual labor, and the simulation test is estimated with a high reliability so as to determine any abnormality.

Figure 1:
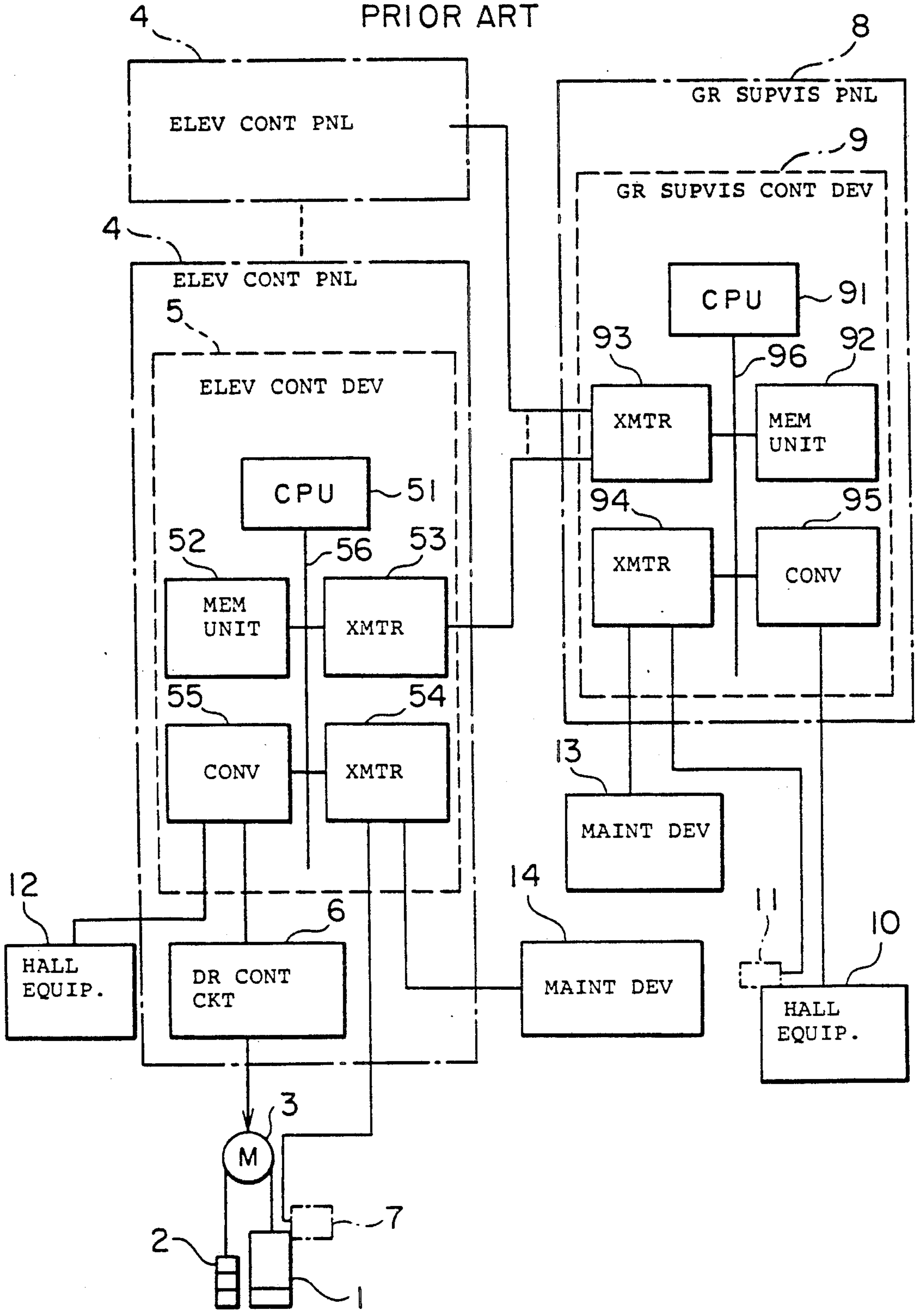
FIG. 1 PRIOR ART
FIG. 1 is a block arrangement diagram showing a conventional elevator system.
Figure 2:
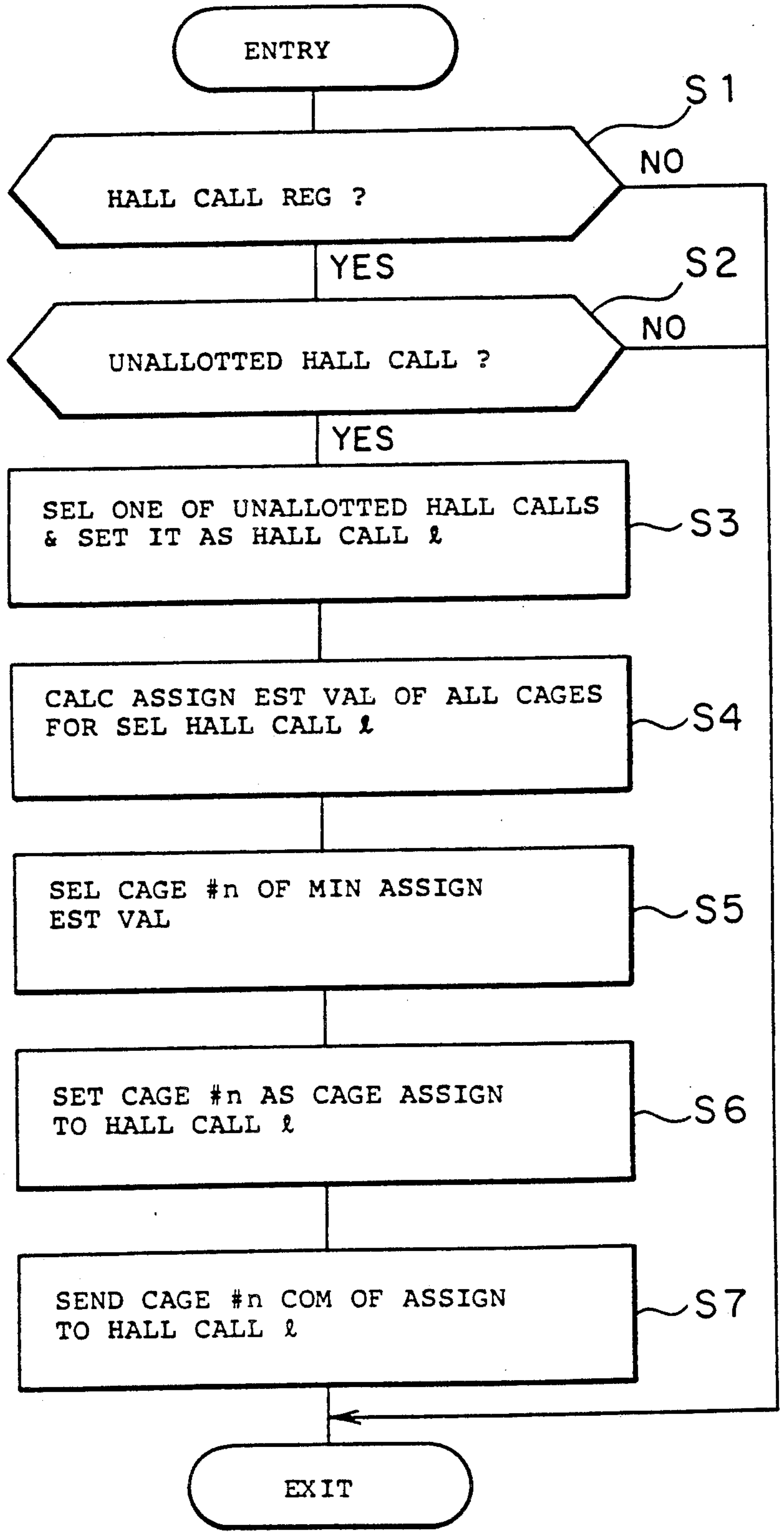
FIG. 2 PRIOR ART

Now, the first embodiment will be described with reference to the drawings. The construction of an elevator system in this embodiment is as shown in FIG. 1, and programs in the maintenance device 13 or 14 and the elevator control device 5 or the group supervision control device 9 may be altered to include the simulation test programs used in this embodiment of the invention. Elevator test functions are set by a program which is processed by the CPU 51 or 91 in the control device or the maintenance device 13 or 14, and this program is stored in the memory unit 52 or 92 and is executed.

Figure 5:
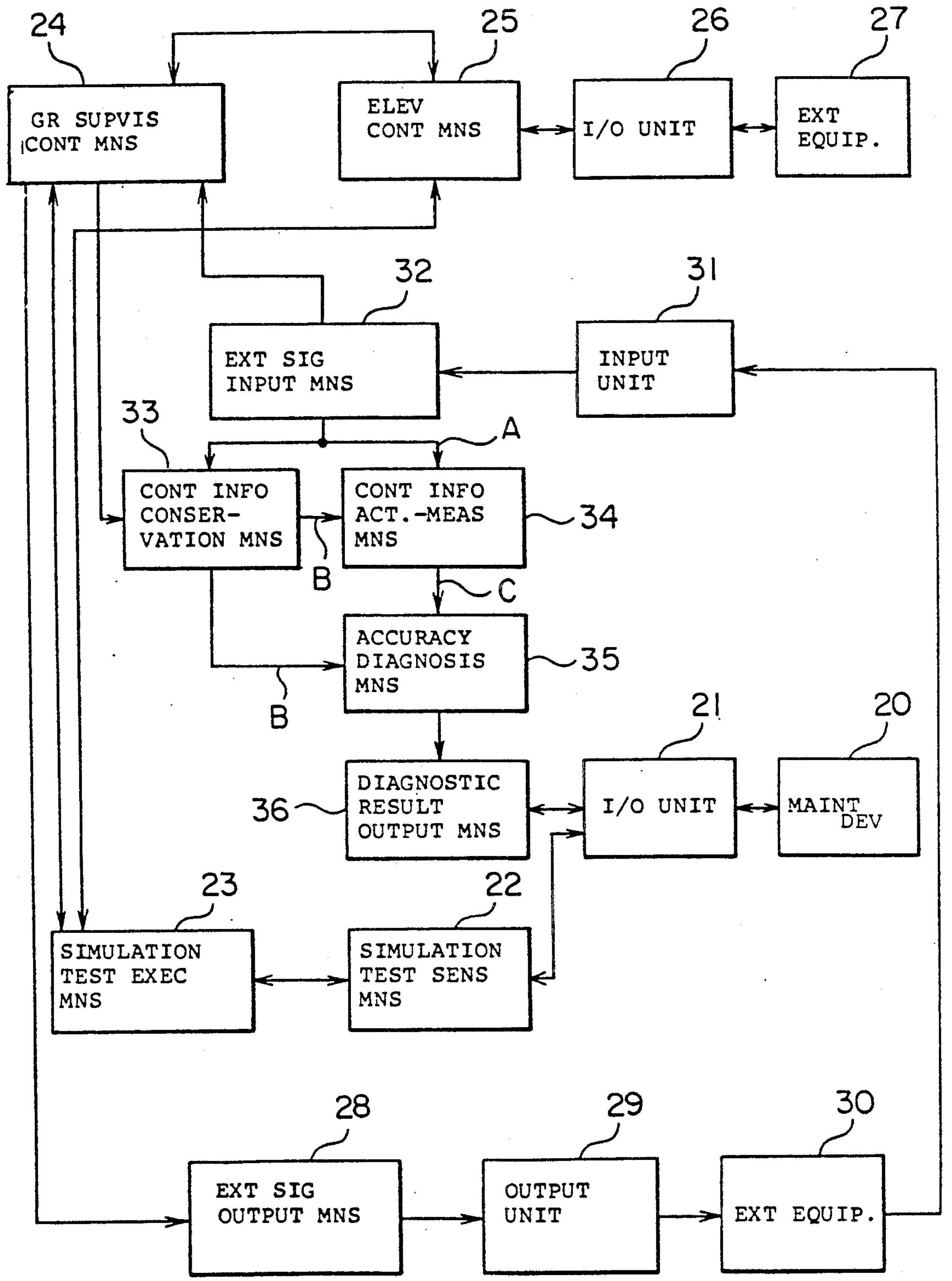

FIG. 5 is a functional block diagram illustrative of a case of testing the group supervision control device 9. An elevator operation simulation test program is assumed to be stored in the CPU 91 within the group supervision control device 9.

Referring to the figure, numeral 20 indicates a maintenance device which corresponds to the foregoing device 13, and which is constructed of, for example, a laptop type personal computer. Numeral 21 indicates an input/output unit which corresponds to the transmitter 94.

Under the direction of the simulation test program stored in the CPU 91, the apparatus provides the functions of blocks 22, 23, 33–36 in the block diagram of FIG. 5. Referring to FIG. 5, a test sensing means 22 generates a simulation test command on the basis of operation command information from the maintenance device 20 while communicating with this maintenance device 20 through the input/output unit 21. Simulation test execution means 23 starts a test task for an elevator operation in accordance with the simulation test command.

Numeral 24 represents group supervision control means included in the group supervision control device 9, and adapted to deliver a command to elevator control means 25 on the basis of a command from the simulation test execution means 23.

The elevator control means 25 is included in the elevator control device 5, and is adapted to drive a predetermined one of the cages 1 on the basis of the commands from the group supervision control means 24 and the simulation test execution means 23.

Numeral 26 denotes an input/output unit which is connected to the elevator control means 25, and which corresponds to the transmitter 54 and the converter 55. Numeral 27 denotes external equipment which is connected to the input/output unit 26, and which corresponds to the drive control circuit 6, the controller 7 and the hall equipment 12.

External signal output means 28 is connected to the group supervision control means 24, while an output unit 29 is connected to the external signal output means 28, and these constituents correspond to the transmitter 94 and the converter 95. External equipment 30 is connected to the output unit 29, and it corresponds to the hall equipment 10 and the controller 11. An input unit 31 is connected to the external equipment 30, while external signal input means 32 is connected to the input unit 31 and the group supervision control means 24, and these constituents correspond to the transmitter 94 and the converter 95.

Numeral 33 denotes control information holding means connected to the group supervision control means 24 and the external signal input means 32. This means 33 determines the control information values of a specified situation (here, group-supervisory control information) among the control information items of the cage under the simulation test operation, and holds the values. Here, the specified situation serves to establish the timing for deriving a control information value which the group supervision control means 24 generates, extinguishes and continuously renews, and it is not always necessary to detect the specified situation. Accordingly, the control information value can also be held without detecting the specified situation, and the case of diagnosing and determining control accuracy is not hampered as long as the point of time at which an actual measurement is started by control information actual-measurement means 34 conforms to the timing.

The control information actual-measurement means 34 is connected to the external signal input means 32 and the control information holding means 33. This means 34 obtains actual measurement information value C corresponding to the control information B held in the control information holding means 33, on the basis of selection information A from the external equipment 30. More specifically, the control information actual-measurement means 34 actually measures the held predictive control information value obtains the actual measurement information in conformity with the timing at which the control information holding means 33 held the control information. On this occasion, it continues the actual measurement until a value corresponding to the held control information value is obtained.

Accuracy diagnosis means 35 is connected to the control information holding means 33 and the control information actual-measurement means 34. It compares the control information B and the actual measurement information C so as to decide the presence of any abnormality, and it records a state at that time.

Diagnostic result output means 36 is connected to the accuracy diagnosis means 35 and the input/output unit 21. It supplies the maintenance device 20 with the result of the decision on the presence of the abnormality and the state from the accuracy diagnosis means 35 while communicating with the maintenance device 20 through the input/output unit 21.

Next, the operation of the first embodiment of this invention shown in FIG. 5 will be described with reference to flow charts in FIGS. 6–11 and the block diagram in FIG. 1.

Figure 6:
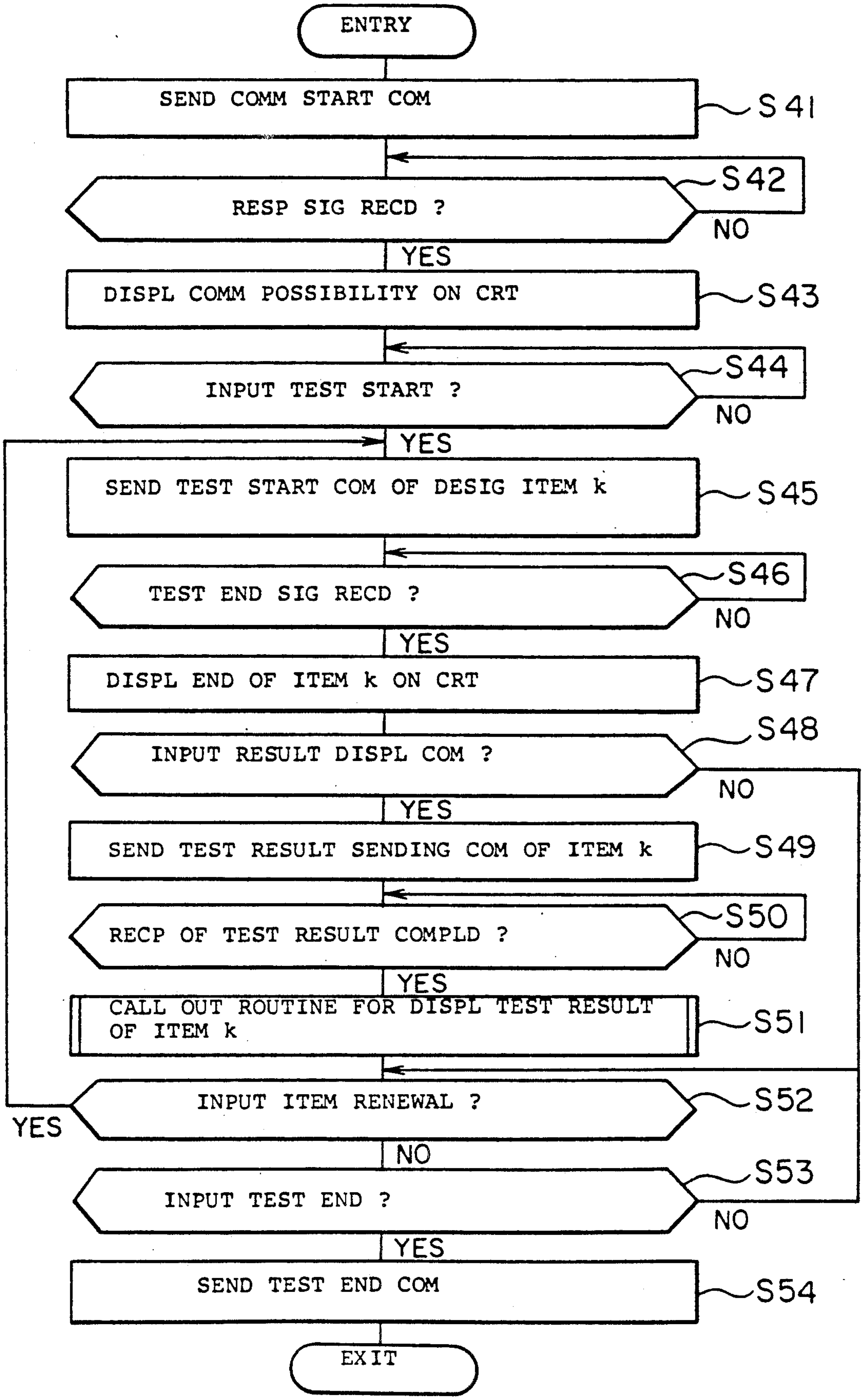

FIG. 6 shows a procedure in the case where an instruction for executing an operating test is controlled by a program which is set in the maintenance device 20 constructed of the laptop type personal computer.

First, a communication start command is sent to the CPU 91, namely, the group supervision control means 24 through the input/output unit 21 constructed of a serial interface (step S41). If a response signal has been received, is decided (step S42). When the response signal has been obtained, the communication possibility display of "OK" is presented on the CRT of the maintenance device 20 (step S43).

Subsequently, if a test start command has been input is decided (step S44). When the test start command (operation command information) and test item No. k have been input on the keyboard of the maintenance device 20, the test start command of the item k is sent to the CPU 91 through the input/output unit 21 (step S45). Incidentally, although there are a plurality of test items, the program in the CPU 91 executes the operating test as to the designated item k.

Next, if the test end signal of the item k has been received from the CPU 91 is decided (step S46), and when it has been received, the end of the item k is displayed on the CRT (step S47). Subsequently, if a command for displaying a test result has been input is decided (step S48). When the display command has been input on the keyboard, the test result sending command of the item k is sent (step S49). Here, unless the display command is input, control flow proceeds from the step S48 to a step S52.

Subsequently, if the reception of the test result has been completed is decided (step S50). When the reception has been completed, a routine for displaying the test result of the item k is called out (step S51), and a procedure for displaying it on the CRT of the maintenance device 20 is called out in correspondence with the item k.

Lastly, if an item renewal has been input is decided (step S52). In a case where a new item is to be further tested, the control flow is returned to the step S45 by inputting the item renewal on the keyboard, whereupon the same procedure is repeated. Besides, in a case where the item renewal is not input, if a test end command has been input is decided (step S53), and when the test end command has been input, it is sent to the CPU 91 (step S54). On the other hand, in a case where the test end command is not input, the control flow returns from the step S53 to the step S48.

Figure 7:
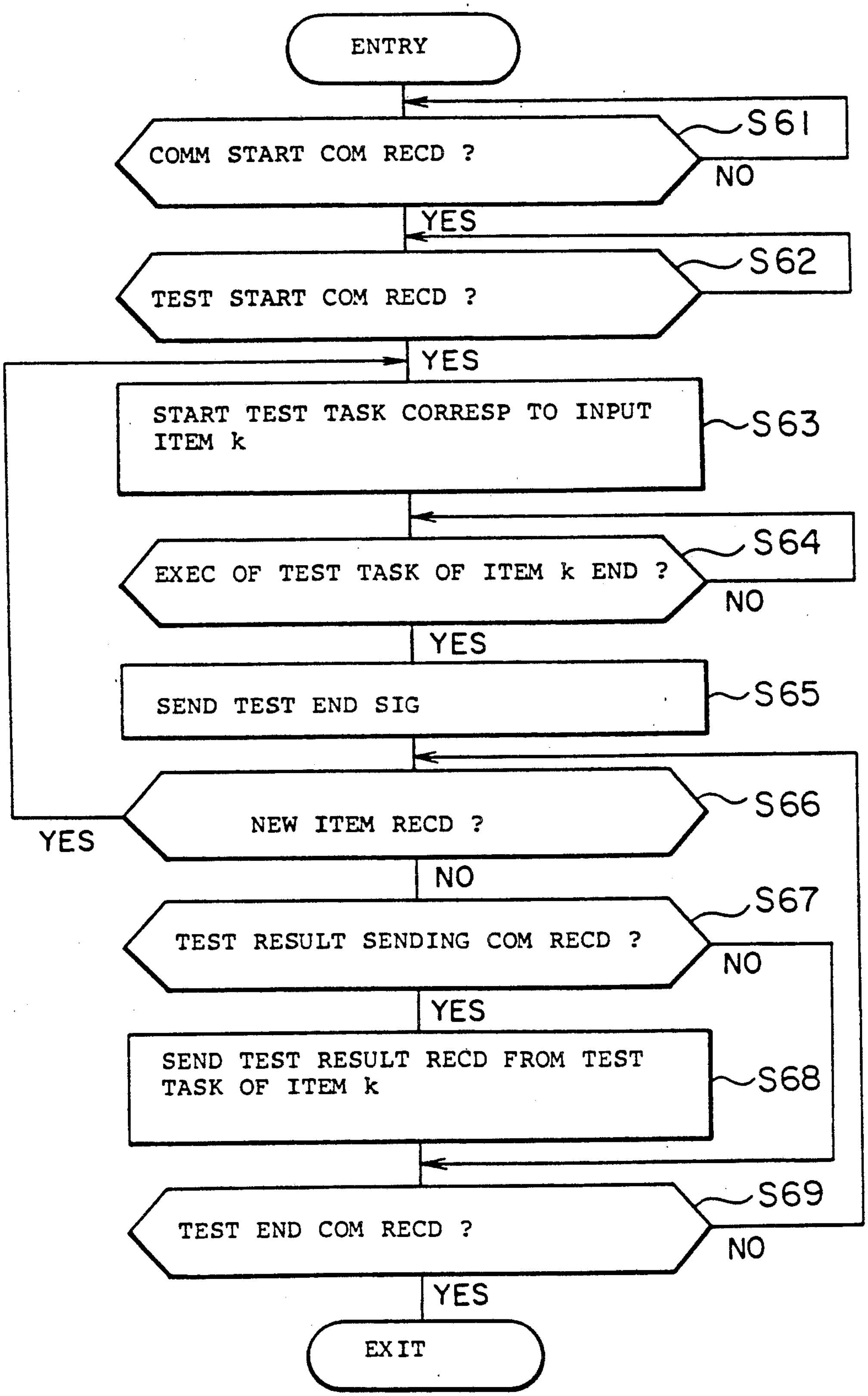

FIG. 7 shows the general processing of that program in the CPU 91 which mates with the program in the maintenance device 20 illustrated in FIG. 6.

First, if a communication start command has been received is decided (step S61), and if a test start command has been received is decided (step S62). When the commands have been received, a test task corresponding to the input item k is started (step S63), and the reception of an execution end signal from the simulation test execution task is awaited. This test task serves to decide whether the elevator operation is good or bad, and it is executed in parallel with the program by the CPU 91.

Next, if the execution of the test task of the item k has ended is decided (step S64). When the execution has ended, a test end signal is sent (step S65). Further, if a new item has been received is decided (step S66). If the new item has been received, the control flow returns to the step S63, and the test task of the new item is repeatedly executed. On the other hand, if any new item has not been received, the reception of a test result command is decided (step S67). If the test result command has been received, test result data (a decision record table) received from the test task of the item k is sent to the maintenance device 20, and if not, the control flow proceeds to a step S69.

Lastly, if a test end command has been received is decided (step S69). When the test end command has been received, the simulation test is ended, and if it has not been received, the control flow returns to the step S66.

Figure 8:
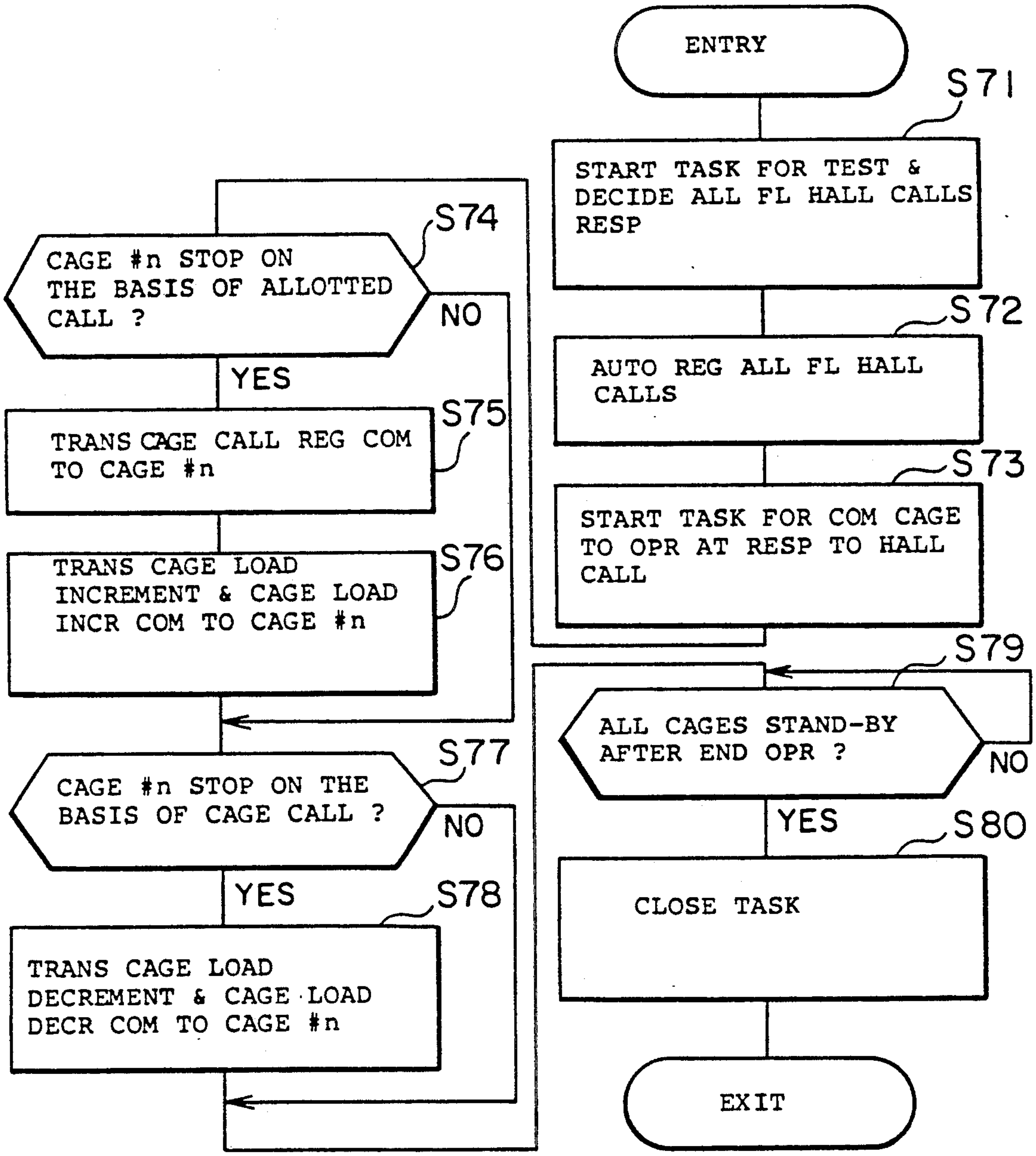

FIG. 8 shows the operating procedure of an all-floor hall-call response test being an example of the simulation test task which is executed by the program in the CPU 91.

First, a task for testing and deciding all-floor hall-call responses is started (step S71), and the up and down hall calls of all floors are automatically registered in individual directions forcibly from the group supervision control device 9 (step S72). Incidentally, after the operating test decision task has been started, it is repeatedly called out at intervals of about 0.1 second until it is closed.

Subsequently, the group supervision control device 9 assigns cages to the registered hall calls. For the purpose of commanding each cage to perform a simulative operation when the assigned cage responds to the hall call, the following task for commanding the cage to operate at the response to the hall call is started (step S73):

Thus, an assignment routine to operate in ordinary service is started, whereby the cages are assigned to the hall calls automatically registered at all the floors and in the individual directions, and elevator operations are carried out. Further, in a case where a cage has responded to an allotted hall call, the command of, e.g., registering a cage call at a predetermined floor is output by the processing of commanding the cage to operate at the response to the hall call, and the cage responds also to the registered cage call.

More specifically, if Cage No. n stopped on the basis of the allotted call is decided (step S74), and a timing for giving the command of the simulative operation at the response to the hall call is detected. In a case where Cage No. n has undergone the stop based on the allotted call in response to the hall call, the command of registering the cage call for the predetermined floor set every hall call is transferred to Cage No. n (step S75), and in a case where Cage No. n has not undergone the stop, the control flow proceeds to a step S77.

Subsequently, a cage load magnitude which is increased at the response to the hall call by a passenger getting on the cage, and a cage load increase command for adding the cage load increment to a load within the cage are transferred to Cage No. n (step S76).

Next, if Cage No. n stopped on the basis of the cage call is decided (step S77), and a timing for giving the command of the simulative operation at the response to the cage call is detected. In a case where Cage No. n has undergone the stop based on the cage call, a cage load magnitude which is decreased at the response to the cage call by a passenger getting off the cage, and a cage load decrease command for subtracting the cage load decrement from a load within the cage are transferred to Cage No. n (step S78).

Then, the cage operation command task ends. Subsequently, the completion of the operation of the all-floor hall-call response test is decided, depending upon whether or not all the cages are standing by without any call (step S79). Thereafter, the all-floor hall-call response test decision task and the hall-call-response cage operation command task are closed (step S80), and the all-floor hall-call response test is completed.

Further, control information generated by the group supervision control means 24 (here, the predictive information of the cage for the group supervision control) is acquired and is actually measured so as to measure the accuracy of the control information and to decide the quality of the operating test, by a program which is started by a task for deciding the operating test.

Figure 9:
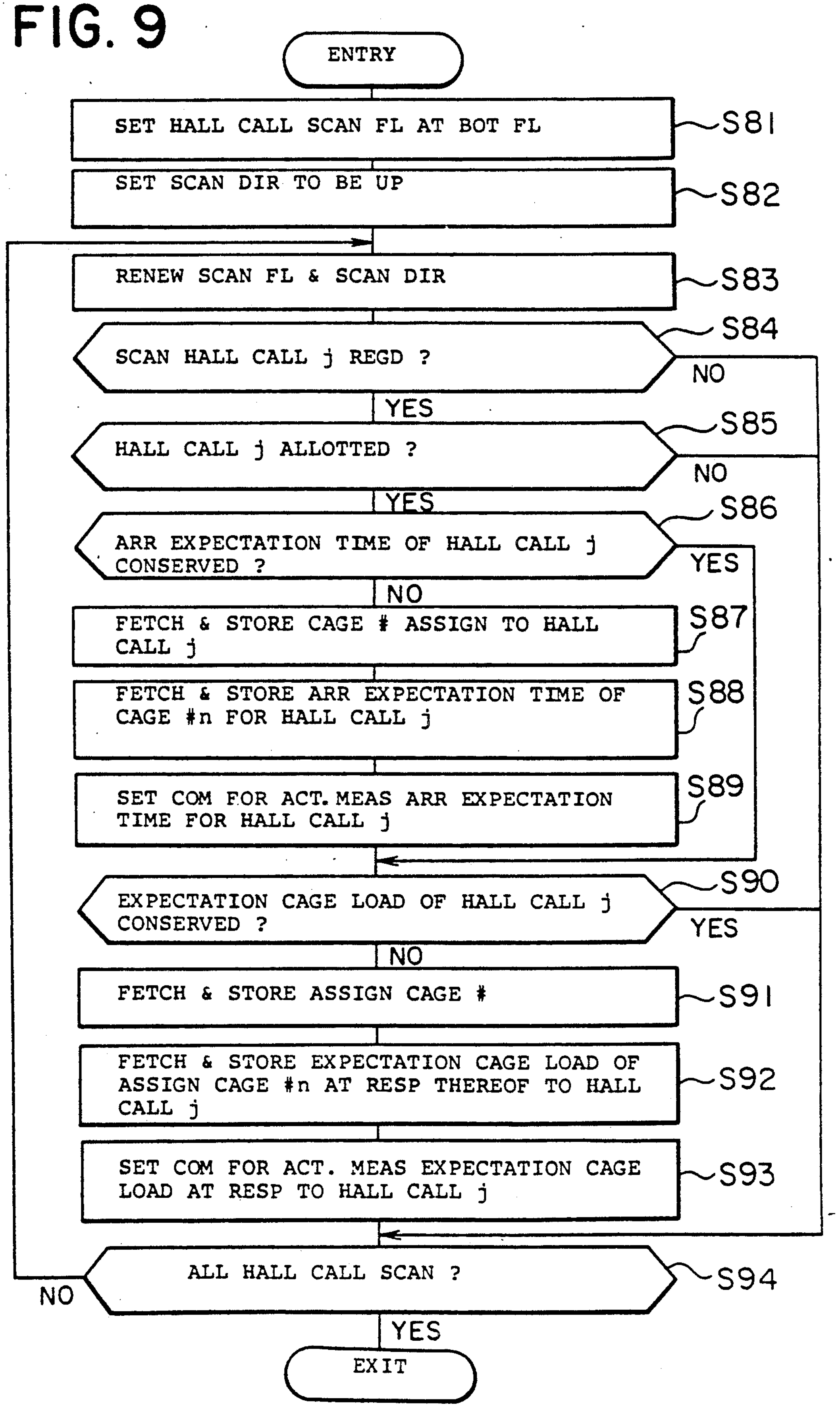

FIG. 9 shows a routine for giving the command of holding the control information and starting the actual measurement which corresponds to the held control information. The routine is performed for the arrival expectation time and the expectation cage load, and it is processed in a task repeatedly called out at intervals of about 0.1 second, by a program in the CPU 91. According to the illustrated operating procedure, when the cages have been assigned to the respective hall calls registered at the individual floors and in the individual directions, the arrival expectation time and the expectation cage load of the cage actually assigned to each hall call are fetched as the items of group supervision control information and are set, stored and held at the addresses of a table corresponding to the allotted hall call, and also, the start of the actual measurement of a value corresponding to the held control information is commanded.

First, the floor at which scanning is started is set at the bottom floor (step S81) in order to decide whether or not the control information items are set in the control information holding table for all the hall calls. The scanning direction which indicates the direction of the hall calls to be scanned is set to be up (step S82).

The scanning floor and the scanning direction are renewed to renew the hall call to-be-scanned by one (step S83). Here, when the top floor has been reached, the scanning direction is set to be down.

Subsequently, if the scanned hall call j which is the hall call being scanned is registered is decided (step S84). When the hall call j is registered, if it has been allotted is decided (step S85). Thus, only in a case where the hall call j being scanned has been registered and allotted, the control information is set in the control information holding table. In a case where the registration or allotment of the hall call j is not decided at the step S84 or S85, so the group supervision control information is not obtained, the control flow proceeds to a step S94, and the control information is not set in the control information holding table.

In a case where the allotment is decided at the step S85, if the arrival expectation time of the hall call j has been held in the control information holding table is decided on the basis of the presence of an actual measurement command (step S86). Upon the decision that the arrival expectation time has not been held, No. of the cage assigned to the hall call j is fetched (step S87), and the arrival expectation time of the assigned cage No. n for the hall call j is fetched (step S88), the fetched items being stored and set at those addresses of the control information holding table which correspond to the hall call j. At the same time, the command for actually measuring the arrival expectation time for the hall call j is also set (step S89).

When the actual measurement command is set, the actual measurement is started by another actual measurement routine, and when the actual measurement ends, the actual measurement command is released by the actual measurement routine. Incidentally, the arrival expectation time is decided held when the actual measurement command is set. In addition, when the holding of the arrival expectation time is decided at the step S86, the control flow proceeds to a step S90.

Next, if the expectation cage load of the hall call j has been set in the control information holding table is decided on the basis of the presence of the actual measurement command (step S90). In a case where the expectation cage load has not been conserved i.e., No. of the cage assigned to the hall call j is fetched (step S91), and the expectation cage load of the assigned cage No. n at the response thereof to the hall call j is fetched (step S92), the fetched items being stored and set at those addresses of the control information holding table which correspond to the hall call j. At the same time, the command for actually measuring the expectation cage load at the response to the hall call j is also set (step S93). When the actual measurement command is set, the actual measurement is started by another actual measurement routine, and when the actual measurement ends, the actual measurement command is released by the actual measurement routine. Incidentally, the expectation cage load is decided held when the actual measurement command is set. In addition, when the holding of the expectation cage load is decided at the step S90, the control flow proceeds to the step S94.

Lastly, if all the hall calls have been scanned is decided (step S94). The control flow is returned to the step S83 in the presence of any hall call to-be-scanned, whereas it is ended in the absence of any hall call to-be-scanned.

By the way, the arrival expectation time which is held here is a period of time read out immediately after the registration of the hall call, and it is therefore equal to the expectation wait time of the hall call. It is also an effective diagnostic method to actually measure the expectation wait time and to compare the measured value with control information. As referred to in the assignment estimation function described before, the expectation wait time is the sum between the arrival expectation time and the continuous wait time at the time of the holding. Therefore, the diagnostic method can be readily realized in such a way that the step of adding the arrival expectation time and the continuous wait time and setting the sum as the expectation wait time is incorporated in the procedure of FIG. 9.

Figure 10:
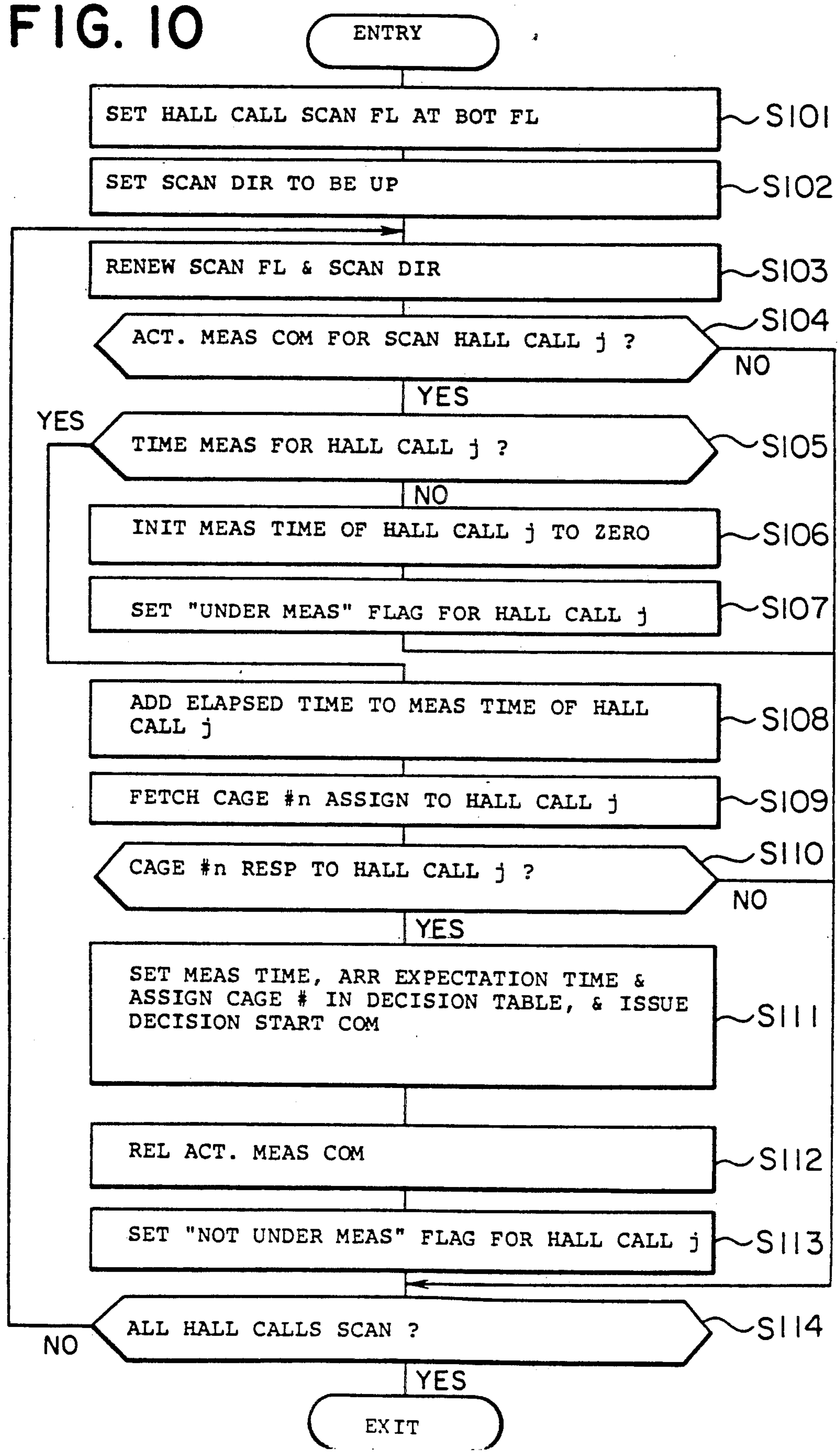

FIG. 10 exemplifies a routine for actually measuring the information which corresponds to the stored group-supervisory control information. The routine is performed for the arrival expectation time, and it is processed in a task which is cyclically and repeatedly called out at intervals of about 0.1 second, by a program in the CPU 91. According to the illustrated operating procedure, as regards those hall calls at the individual floors and in the individual directions for which actual measurement commands have been respectively issued, the period of time which is taken since the issue of each actual-measurement command till the arrival of the assigned cage is actually measured. Further, the actual measurement information and relevant information are stored in a deciding table, and the actual measurement command is released to get ready for the next actual measurement.

First, likewise to the steps S81–S83 in FIG. 9, in order to decide whether or not the actual-measurement information items are set in the storage table for all the hall calls, the floor at which scanning is started is set at the bottom floor (step S101), the scanning direction of the hall calls is set to be up (step S102), and the scanning floor and the scanning direction are renewed (step S103).

Subsequently, if the command of actually measuring the arrival expectation time is set for the hall call j being scanned is decided (step S104), and the actual measurement is done only when the command is set. In the case where the actual measurement command is set, if a time is being measured for the hall call j is decided (step S105). When any time is not being measured, namely, when the actual measurement has been started, a time measurement memory for the hall call j is cleared to initialize the measurement time thereof to zero (step S106). An "under measurement" flag is set to indicate the measurement of the hall call j (step S107), whereupon the control flow proceeds to a step S114.

On the other hand, when it has been decided at the step S105 that the time of the hall call j is being measured, a period of time having lapsed since the last processing of this routine is added to the value of the time measurement memory corresponding to the hall call j (step S108). Besides, Cage No. n assigned to the hall call j is fetched (step S109). Subsequently, if the assigned cage No. n of the hall call j has responded to this hall call j is decided (step S110). When the assigned cage has responded, the measurement time, arrival expectation time and assigned Cage No. are set in the decision table, and a decision start command is issued (step S111).

Thus, the actual measurement on the hall call j is completed, and the results of the actual measurement are set and stored in the columns of the arrival expectation time-deciding table for the hall call j, as follows:

(i) The previous value of the time measurement memory corresponding to the hall call j is set in the column of the actually measured value.

(ii) The arrival expectation time corresponding to the hall call j is fetched from the control information holding table, and is set in the column of the predictive value.

(iii) The assigned cage No. of the hall call j in the control information holding table is set in the column of the assigned cage No.

(iv) The decision start command of the hall call j is set.

Subsequently, the arrival expectation time actual-measurement command of the hall call j in the control information holding table is released (step S112). In addition, the "under measurement" flag is reset to indicate that the hall call j is not being measured (step S113) so as to get ready for the next diagnosis. Lastly, if all the hall calls have been scanned is decided (step S114). The control flow is returned to the step S103 in the presence of any hall to-be-scanned, whereas it is ended in the absence of any hall call to-be-scanned.

Figure 11:
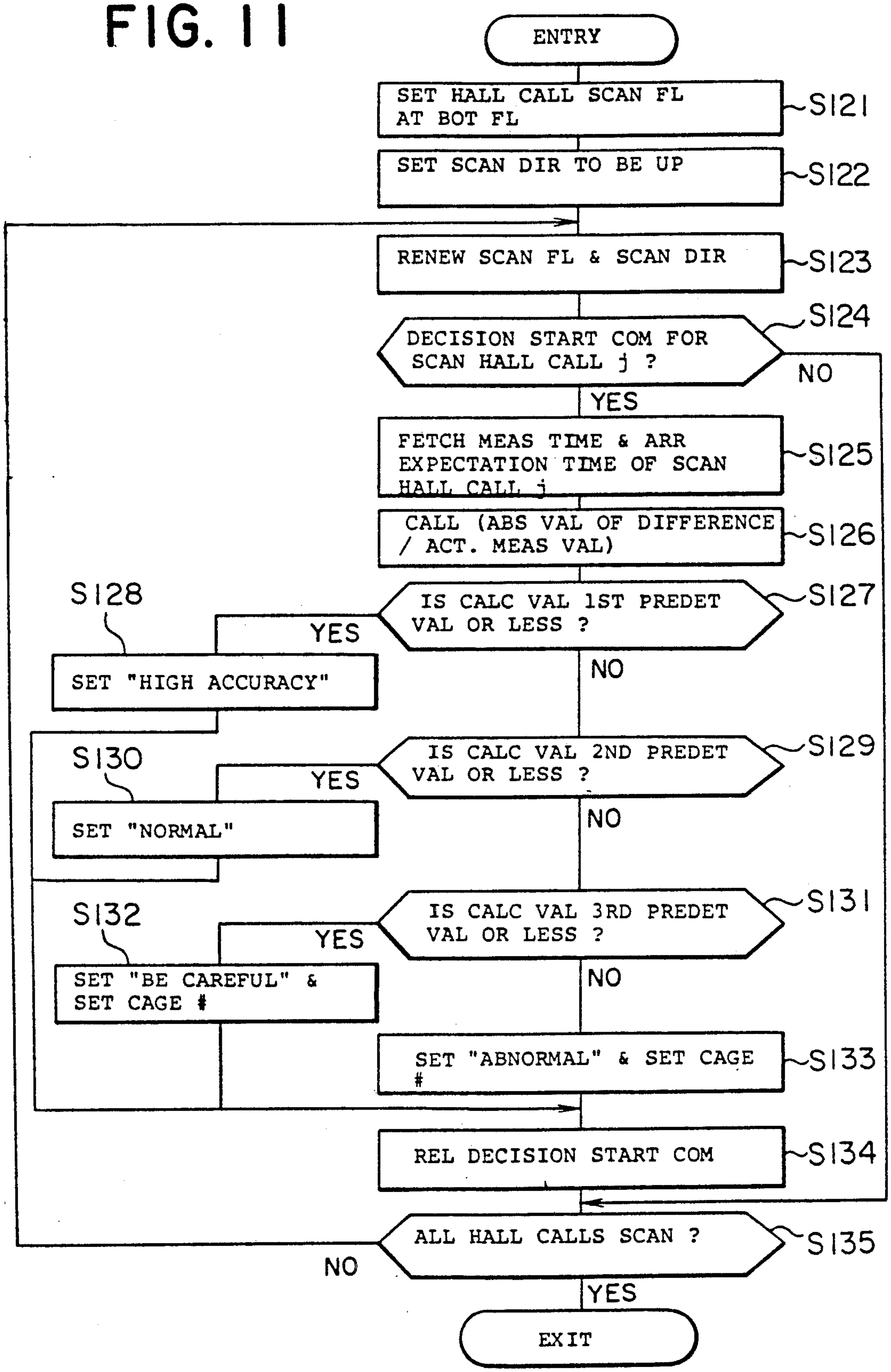

FIG. 11 exemplifies a routine in which the control information and the actual measurement information corresponding thereto as respectively obtained with the procedures of FIG. 9 and FIG. 10 are compared so as to decide the presence of any abnormality, to record a state and to diagnose an accuracy. The routine is performed for the arrival expectation time, and it is processed in a task which is cyclically and repeatedly called out at intervals of about 0.1 second, by a program in the CPU 91. According to the illustrated operating procedure, the arrival expectation time and the actual measurement time set in the decision table for each of the hall calls at the individual floors and in the individual directions are compared, the degree of any abnormality is decided in accordance with the magnitude of the absolute value of the difference of the comparison, and the result of the decision is set and stored in a decision result table.

First, likewise to the steps S81–S83 in FIG. 9, in order to decide whether or not all the hall calls are diagnosed, the scanning start floor is set at the bottom floor (step S121), the scanning direction is set to be up (step S122), and the scanning floor and the scanning direction are renewed (step S123).

Subsequently, if a decision start command is issued for the hall call j being scanned is decided (step S124), and the diagnoses are done only for the hall calls having the decision start commands. In the absence of the decision start command, the control flow proceeds to a step S135.

When the presence of the decision start command has been decided at the step S124, the actually measured time (the measurement time) and the arrival expectation time are fetched from the decision table with respect to the hall call j being scanned (step S125). The absolute value of the difference of both the times is divided by the actual measurement value so as to obtain the rate of discrepancy from (the absolute value of the difference/the actual measurement value) (step S126).

If the calculated value of the rate of discrepancy is the first predetermined value (for example, 0.01) or less is decided (step S127). When the first predetermined value is not exceeded, the accuracy is decided to be very high, and "high accuracy" is set in the decision result table (step S128).

Besides, in a case where the calculated value is greater than the first predetermined value, if it is the second predetermined value (for example, 0.1) or less is decided (step S129). When the second predetermined value is not exceeded, the accuracy is decided to involve no special abnormality, and "normal" is set in the decision result table (step S130).

In addition, in a case where the calculated value is greater than the second predetermined value, if it is the third predetermined value (for example, 0.5) or less is decided (step S131). When the third predetermined value is not exceeded, the accuracy is decided to be inferior, and "be careful" is set in the decision result table, while at the same time, No. of the assigned cage is set for reference in clearing up the cause (step S132).

Further, in a case where the calculated value is greater than the third predetermined value, the accuracy is decided to be very inferior, and "abnormal" is set in the decision result table, while at the same time, No. of the assigned cage is set for reference in clearing up the cause (step S133).

Subsequently, the decision start command is released (step S134) to get ready for the next diagnosis. If all the hall calls have been scanned, is decided (step S135). The control flow is returned to the step S123 in the presence of any hall call to-be-scanned, whereas it is ended in the absence of any hall call to-be-scanned.

Thus, the operating test is conducted in such a way that the group-supervisory control information, particularly the group-supervisory predictive information is acquired as the control information, whereupon the control accuracy is decided from the control information and the actual measurement information corresponding thereto. Needless to say, however, the quality of the operation of the elevator system is simultaneously decided also by another method.

Such an elevator testing apparatus with which the operating test is decided by acquiring the group-supervisory predictive information, diagnoses and decides the accuracy of the arrival expectation time or the expectation load value of the cage. Therefore, it is applicable not only to the group supervision control program, but also to the control program of each cage on which the arrival expectation time or the expectation load value is based, and to the extensive inspections of a travel operation, a weighing instrument, etc., which is a system component. Moreover, it is applicable to such an occasion where, as to service pattern control information in the case of executing an elevator service pattern, cage-allocation-number command information, for example, is decided to be excessive or deficient from the members of passengers who have actually got on the cages.

Further, although the above embodiment has been explained as to the case of making the operating test with the maintenance device 20 connected to the group supervision control device 9, an operating test may well be made with the maintenance device connected to the elevator control device 5 of each cage. In this case, an acceleration pattern, for example, derived from the elevator control device 5 is acquired as control information, and the control information is compared with a travel curve actually measured on the basis of input information in the actual operation of the cage 1, whereby if the cage 1 has traveled in conformity with the acceleration pattern may be decided.

As thus far described, this embodiment provides simulation test sensing means for generating a simulation test command on the basis of operation command information from a maintenance device, simulation test execution means for operating a cage in accordance with the simulation test command, control information holding means for holding the control information of the cage under the simulation test operation, control information actual-measurement means for obtaining actual measurement information corresponding to the control information on the basis of selection information, and accuracy diagnosis means for comparing the control information and the actual measurement information so as to diagnose the presence of any abnormality, so that the specified control information in the case where the simulation test execution means operates the cage is compared with the actual measurement information corresponding to the control information which is obtained when the cage is actually operated. Therefore, the embodiment brings forth the effects that the analytical diagnosis is permitted without manual labor, and that an elevator testing apparatus which can determine an abnormality with high precision and which has a high reliability is provided.

Now, the second embodiment will be described. This embodiment is disclosed as a group supervision control which is automatically diagnosed by comparing information generated internally and actual information obtained by an actual measurement. In particular, this embodiment is disclosed in the block diagram of FIG. 12 as providing holding means for selecting and holding predictive information generated internally, means for actually measuring a value corresponding to the held predictive information in accordance with an external input signal, and means for comparing the held predictive information value and the actual measurement value so as to diagnose the presence of any abnormality.

In this embodiment, the fundamental predictive information which is generated internally and which governs the group supervision performance is held, and the predictive information and the information value obtained by the actual measurement as corresponds to the former are compared to make a diagnosis, whereby the accuracy of the predictive information obtained through a complex calculating process can be exactly diagnosed, and even that degradation of the group supervision performance which is unable to be discriminated as being normal or abnormal can be determined.

The second embodiment will be described below with reference to FIGS. 12–18.

Figure 12:
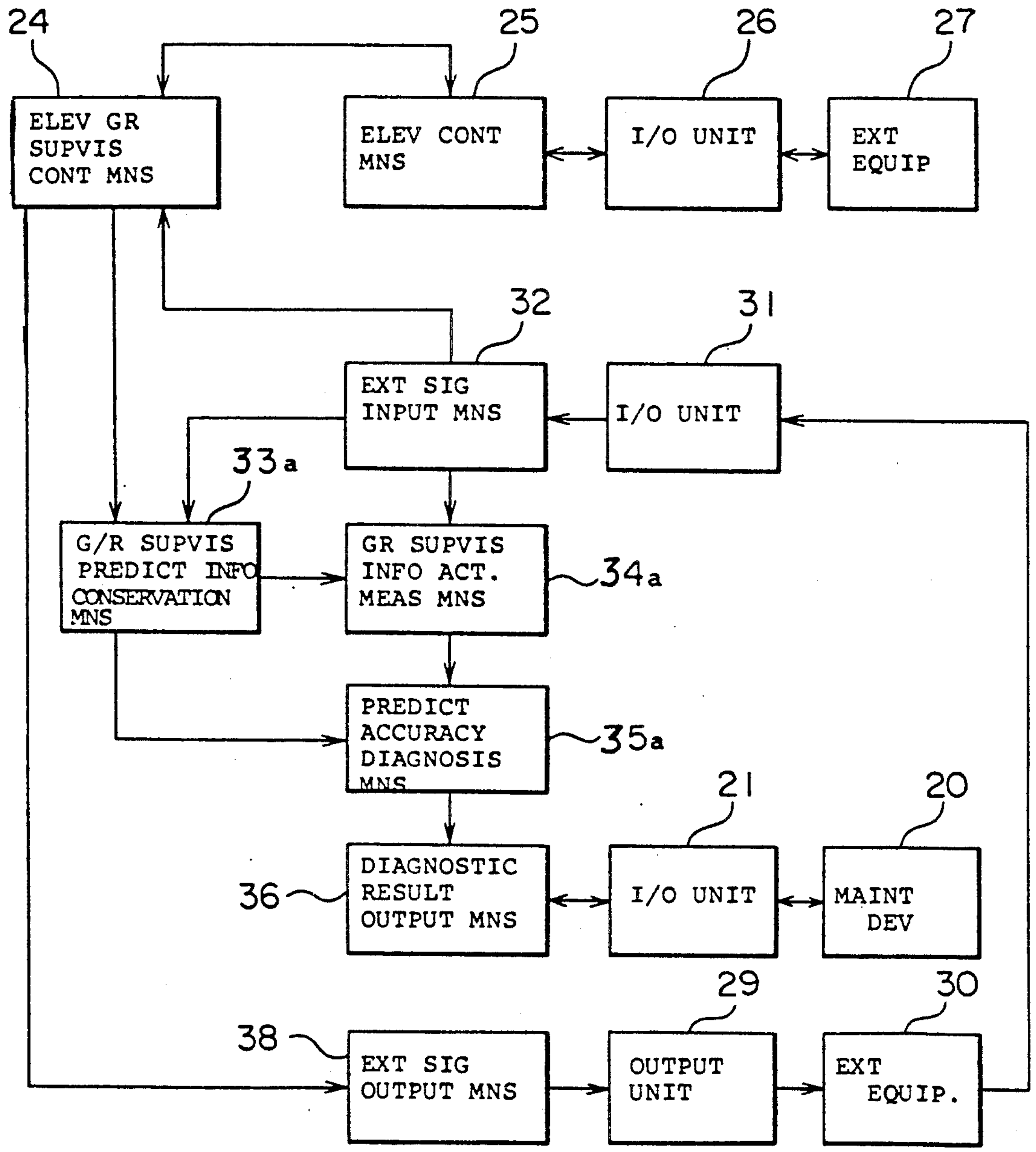

FIG. 12 is a block diagram of an elevator system in this embodiment, in which portions corresponding to those in FIG. 5 are indicated by the same symbols.

Usually, an elevator control device or an elevator group-supervision control device accepts hall calls and cage calls and also signal inputs from external devices and external equipment such as a motor, a door and a monitor room equipment, and it executes control processing operations corresponding to them and delivers or sends control signals to the external devices and equipment again.

Referring to FIG. 12, numeral 24 indicates elevator group-supervision control means provided in the elevator group-supervision control device which is included in an elevator group-supervision control panel or an elevator group-supervision control panel or an elevator control panel. Numeral 25 indicates elevator control means provided in the elevator control device which is included in the elevator control panel. An input unit 31 is provided in the elevator group-supervision control device, and it includes a signal input equipment such as converter and a transmission equipment. External signal input means 32 supplies the elevator group-supervision control means 24 with an external input signal for the elevator group-supervision control device as accepted from the input unit 31, thereby causing the means 24 to perform the group supervision control of the elevator system. The external input signal from this external signal input means 32 is also supplied to group-supervisory information actual-measurement means 34*a* and group-supervisory predictive-information holding means 33*a* to be described later.

An output unit 29 is provided in the elevator group-supervision control device, and it includes a signal output equipment such as converter and a transmission equipment. External signal output means 28 delivers or sends a control signal from the elevator group-supervision control means 24, to an external equipment 30 through the output unit 29. The external equipment 30 corresponds to an elevator equipment such as hall call buttons or the peripheral device of the elevator system as is located outside the elevator group-supervision control device, and it is connected to the input unit 31. Shown at numeral 26 is an input/output unit which serves to input/output signals and transmit/receive signals between the elevator control means 25 and an external equipment 27 and which includes a signal input/output equipment such as converter and a transmission equipment. The external equipment 27 corresponds to an elevator equipment such as destination floor buttons or the peripheral device of the elevator system as is located outside the elevator control device. An input-/output unit 21 serves for transmitting/receiving signals between it and a maintenance device 21 to be described below, and it includes a transmission equipment. The maintenance device 20 is used for adjustments at the installation of the elevator system or inspections at the maintenance thereof. By way of example, the maintenance device 20 is constructed of control switches or display elements such as LEDs and is disposed in the elevator group-supervision control device, or it is constructed of a laptop type personal computer which is connected through a transfer element. In this embodiment, the case of employing the laptop type personal computer is illustrated.

Symbol 33*a* denotes the group-supervisory predictive-information holding means for selecting and holding group-supervisory predictive information generated by the elevator group-supervision control means 24 and to be used as group-supervisory control information, till a specified point of time upon deciding a specified situation. Here, the specified situation where the group-supervisory predictive information is held serves to measure a timing for deriving a predictive information value which the elevator group-supervision control means 24 generates, extinguishes and renews at all times. In this regard, it is sometimes possible to hold the group-supervisory predictive information without detecting the specified situation, and the case of diagnosing a prediction accuracy is not hampered as long as the point of time at which an actual measurement is started by the group-supervisory information actual-measurement means 34*a* conforms to the timing.

The specified point of time till which the group-supervisory predictive information is held signifies the point of time at which an actual measurement value corresponding to the held predictive information value is obtained.

The group-supervisory information actual-measurement means 34*a* actually measures the value which corresponds to the group-supervisory predictive information held by the group-supervisory predictive-information holding means 33*a*, and it executes the actual measurement in conformity with the timing at which the group-supervisory predictive information was selected and held by the group-supervisory predictive-information holding means 33*a*. On this occasion, it continues the actual measurement until the value corresponding to the held predictive information is obtained, that is, till the specified point of time which has been stated in relation to the group-supervisory predictive-information holding means 33*a*.

Prediction accuracy diagnosis means 35*a* decides the presence of any abnormality from the difference between the group-supervisory predictive-information value held by the group-supervisory predictive-information conservation means 33*a* and the actual measurement value afforded by the group-supervisory information actual-measurement means 34*a*, and records the state of the decision. Diagnostic result output means 36 communicates with the maintenance device 20 through the input/output unit 21, and delivers thereto the decision on the presence of any abnormality and the state which have been recorded by the prediction accuracy diagnosis means 35*a*. When the maintenance device 20 is constructed of the laptop type personal computer or the like, means for displaying the diagnostic results or recording them on a floppy disk, etc. are included on the maintenance device side. When the maintenance device 20 is constructed of LEDs or the like and is disposed in the elevator group-supervision control device, the diagnostic result output means 36 controls the display of the diagnostic results or processes input signals from the control switches.

In the self-diagnostic apparatus constructed as described above, the elevator group-supervision control means 24 provided in the elevator group-supervision control device which is included in the elevator group-supervision control panel or the elevator control panel generates the group-supervisory predictive information to be used as the group-supervisory control information, on the basis of the information items of the external equipment such as hall calls from the input unit 31 and the information items of cages from the elevator control means 25, thereby to perform the group supervision control of the elevator system such as the assignments of the optimum cages to registered hall calls. Control commands etc. for the group supervision control are delivered from the external signal output means 28 through the output unit 29 to the external equipment 30 and are further delivered to the elevator control means 25.

The elevator control means 25 included in the elevator control panel controls the external equipment 27 through the input/output unit 26 and causes the cage to respond to registered destination calls and allotted hall calls, on the basis of control information from the elevator group-supervision control means 24.

The group-supervisory predictive-information holding means 33*a* selects and holds the group-supervisory predictive information generated by the elevator group-supervision control means 24, till the specified point of time in the future upon deciding the specified situation, while the group-supervisory information actual-measurement means 34*a* actually measures the value corresponding to the group-supervisory predictive information held by the group-supervisory predictive-information holding means 33*a*. The prediction accuracy diagnosis means 35*a* diagnoses the accuracy of the group-supervisory predictive information and decides the presence of any abnormality, on the held basis of the group-supervisory predictive information and the value actually measured. The decided result is delivered from the diagnostic result output means 36 through the input-/output unit 21 to the maintenance device 20 such as personal computer.

In this embodiment, as described above, the elevator system itself selects and holds group-supervisory predictive information and obtains information corresponding to the held group-supervisory predictive information, owing to an actual measurement, so as to compare the actual measurement value and the predictive information value, whereby the presence of any abnormality of the elevator system concerning phenomena which appear as only a miss in a prediction accuracy, etc. can be self-diagnosed from the result of the comparison. Incidentally, the result of the self-diagnosis can be known through the maintenance device 20.

Figure 13:
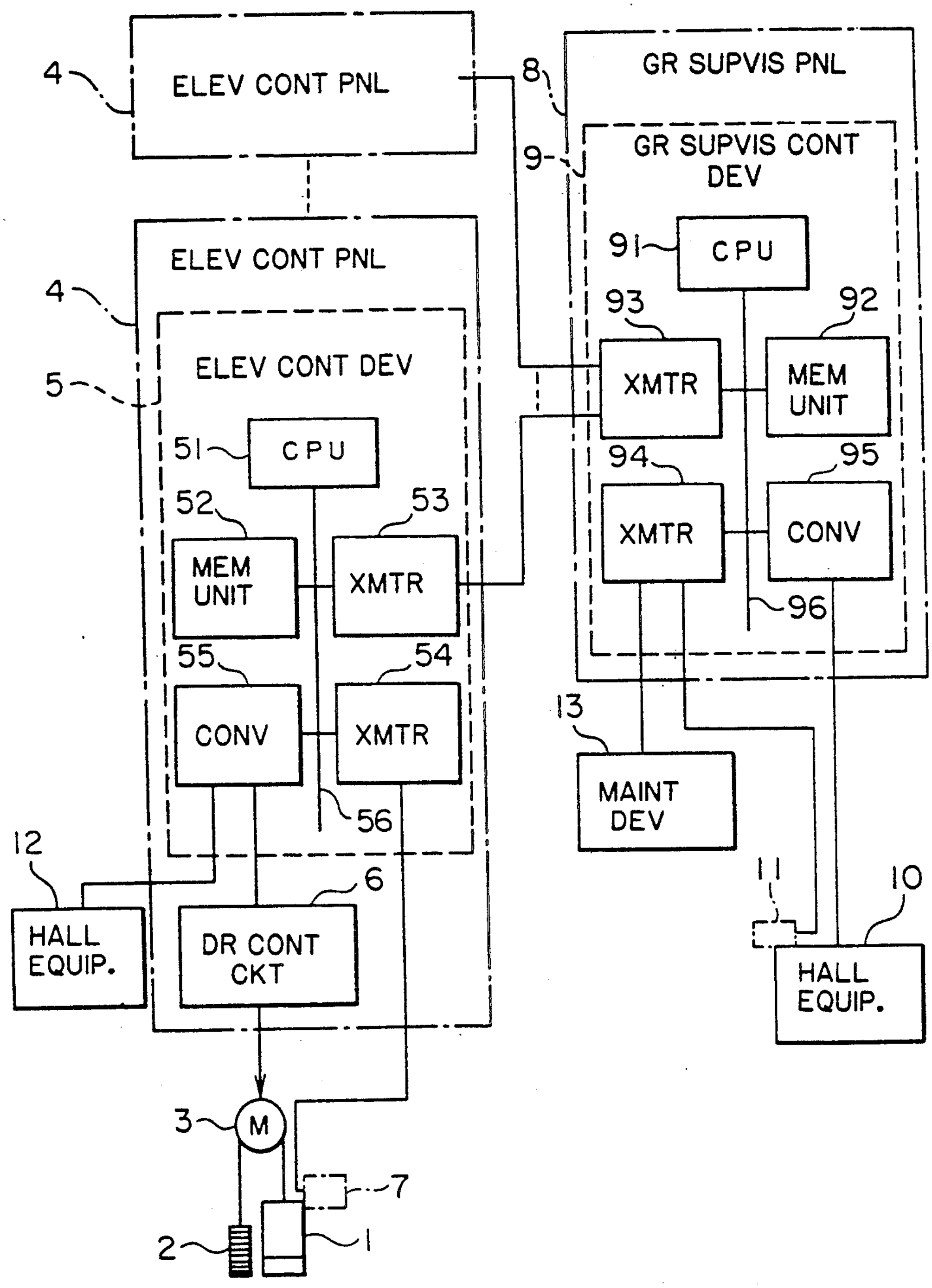

FIG. 13 is a diagram of a practicable arrangement for realizing the system shown in FIG. 12.

Referring to FIG. 13, numeral 1 designates a cage, numeral 2 a counterweight, and numeral 3 a hoist motor. Elevator control panels 4 are respectively provided in correspondence with a plurality of cages 1. Each of the elevator control panels 4 includes an elevator control device 5 constructed of a microcomputer, and a drive control circuit 6 for the hoist motor 3. It controls the hoist motor 3, thereby controlling the cage 1 and the counterweight 2 to move up and down.

The elevator control device 5 includes a central processing unit (CPU) 51 which controls the whole device, a memory unit 52 which is configured of a read only memory (ROM, specifically EPROM) and a random access memory (RAM) (the constituent RAM is backed up by a battery against the failure of power supply), a serial transmitter 53 which is constructed of a device such as Product 8251 manufactured by Intel Inc. and which serves to connect the elevator control device 5 with a group supervision control device 9, a serial transmitter 54 which serves to connect the elevator control device 5 with a controller 7 (similar in construction to the control device 5) that is constructed of a microcomputer and that is disposed on the cage 1, and a converter 55 which is connected with the drive control circuit 6, which receives external information and by which the delivery of a command for controlling the hoist motor 3 is interfaced through voltage conversion or the like. This converter 55 is also connected with a hall equipment 12 (which corresponds to the external equipment 27 in FIG. 12 and which is configured of hall lanterns etc.). Numeral 56 indicates an internal bus.

Numeral 8 denotes an elevator group-supervision panel, in which the group supervision control device 9 constructed of a microcomputer is built. The group supervision control device 9 includes a central processing unit (CPU) 91 which controls the whole device, a memory unit 92 which is configured of a ROM (EPROM) and a RAM, a serial transmitter 93 which serves to connect the group supervision control device 9 with the elevator control devices 5, a serial transmitter 94 which serves to connect the group supervision control device 9 with a maintenance device 13 (corresponding to the maintenance device 20 in FIG. 12) for giving the command of an operating test, etc. and with a hall controller 11, and a converter 95 which receives external information in connection with a hall equipment 10 (corresponding to the external equipment 30 in FIG. 12) for generating hall calls etc. and by which the delivery of a command for controlling the hall equipment 10 is interfaced through voltage conversion or the like. Numeral 96 indicates an internal bus.

Next, the operation of this embodiment constructed as stated above will be described with reference to flow charts in FIGS. 14 thru 18.

Figure 14:
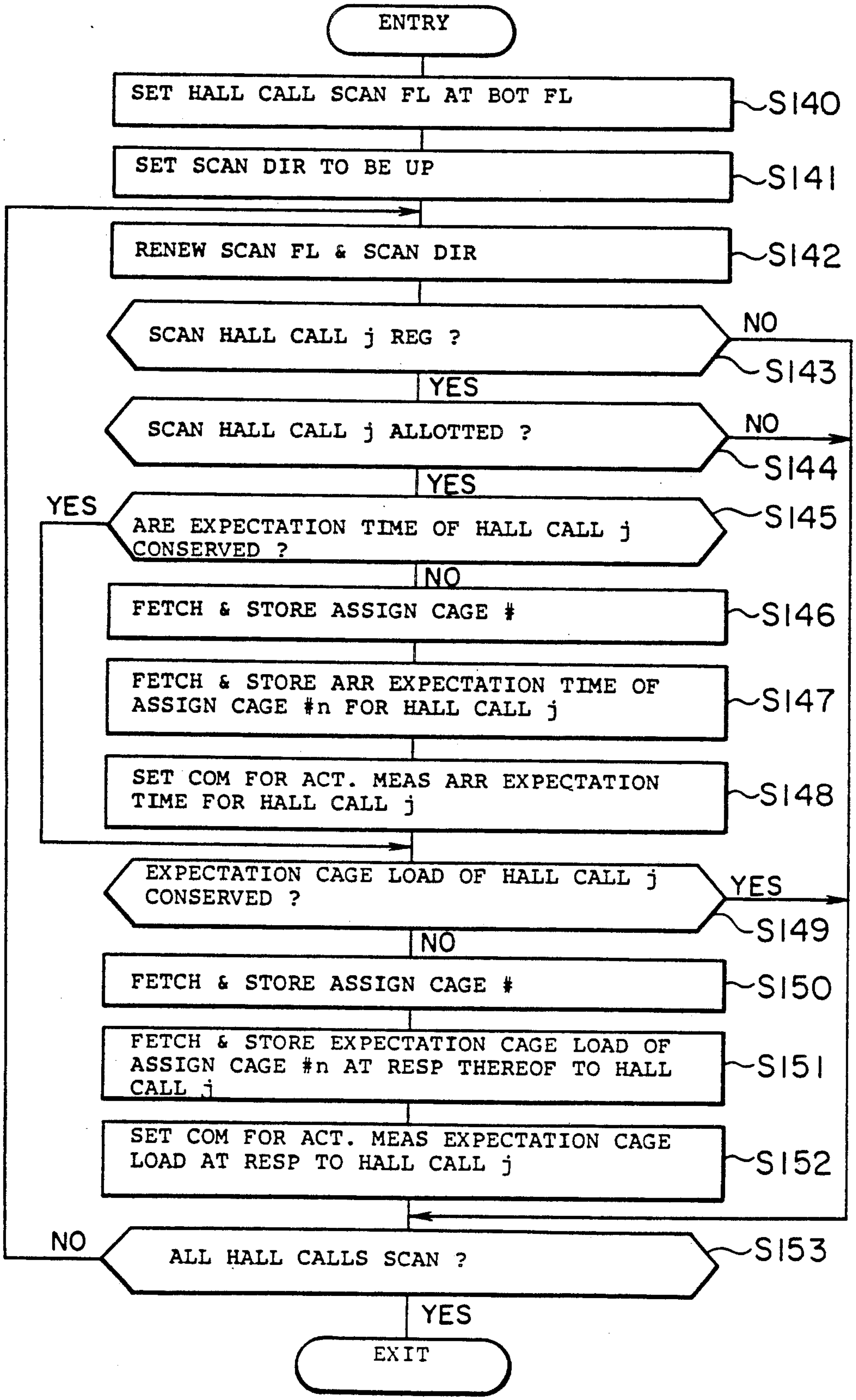

FIG. 14 shows the processing procedure of the elevator group-supervision control device in this embodiment. As an example of a routine for fetching group-supervisory predictive information, holding the information and giving the command of the start of an actual measurement corresponding to the held information, the routine is performed for an arrival expectation time and an expectation cage load.

Here, when the respective hall calls have been registered at individual floors and in individual directions and the cages have been assigned thereto, the arrival expectation time and the expectation cage load of the cage actually assigned to each hall call are fetched and are set and stored at the addresses of a table corresponding to the allotted hall call, and also, the command of actually measuring a value corresponding to the set information is issued. Incidentally, the routine is processed in a task which is cyclically and repeatedly called out at intervals of about 0.1 second.

Referring to FIG. 14, at a step S140, the floor at which scanning is started is set at the bottom floor in order to decide whether or not the predictive information items are set in the predictive-information holding table for all the hall calls. At the next step S141, the scanning direction which indicates the direction of the hall calls to be scanned is set to be up.

At the next step S142, the scanning floor is renewed to renew the hall call to-be-scanned by one. When the top floor has been reached, the scanning direction is set to be down. The hall call being scanned is denoted by j.

At the next step S143, if the scanned hall call j is registered is decided. Further, at a step S144, if the hall call j has been allotted is decided. Thus, only in a case where the hall call j being scanned has been registered and allotted, the group-supervisory predictive information is set in the predictive-information holding table. In any other case, the group-supervisory predictive information is not obtained and is not set in the predictive-information holding table.

At the next step S145, whether or not the arrival expectation time is held (is set in the predictive-information holding table) is decided on the basis of the presence of an actual measurement command. When the arrival expectation time has not been held, the control flow shifts to a step S146, at which No. of the cage assigned to the hall call j is fetched and is stored at the address of the predictive-information holding table corresponding to the hall call j. Further, at the next step S147, the arrival expectation time of the assigned cage No. n is fetched and is stored at the address of the predictive-information holding table corresponding to the hall call j. At the next step S148, the command of actually measuring the arrival expectation time for the hall call j is also set. When the actual measurement command is set, the actual measurement is started by another actual measurement routine, and when the actual measurement ends, the actual measurement command is released by the actual measurement routine. (The arrival expectation time is decided held when the actual measurement command is set.)

At the next step S149, whether or not the expectation cage load is held (is set in the predictive-information holding table) is decided on the basis of the presence of an actual measurement command. When the expectation cage load has not been held, the control flow shifts to a step S150, at which No. of the cage assigned to the hall call j is fetched and is stored at the address of the predictive-information holding table corresponding to the hall call j. Further, at the next step S151, the expectation cage load of the assigned cage is fetched and is set at the address of the predictive-information holding table corresponding to the hall call j. At the next step S152, the command of actually measuring the expectation cage load at the response of the cage to the hall call j is also set. When the actual measurement command is set, the actual measurement is started by another actual measurement routine, and when the actual measurement ends, the actual measurement command is released by the actual measurement routine. (The expectation cage load is decided held when the actual measurement command is set.)

At a step S153, if all the hall calls have been scanned is decided. The control flow is ended in the absence of any hall call to-be-scanned.

By the way, the arrival expectation time which is held in this case is a value read out immediately after the registration of the hall call, so that it becomes equal to the predictive wait time of the hall call.

It is also an effective diagnosis to actually measure the predictive wait time and to compare the measured value with a held value. As already stated, the predictive wait time is the sum between the arrival expectation time and the continuous wait time on the occasion of the holding. Therefore, this diagnosis can be readily realized in such a way that the step of adding the arrival expectation time and the continuous wait time and setting the sum as the predictive wait time is incorporated in the procedure of this embodiment.

Figure 15:
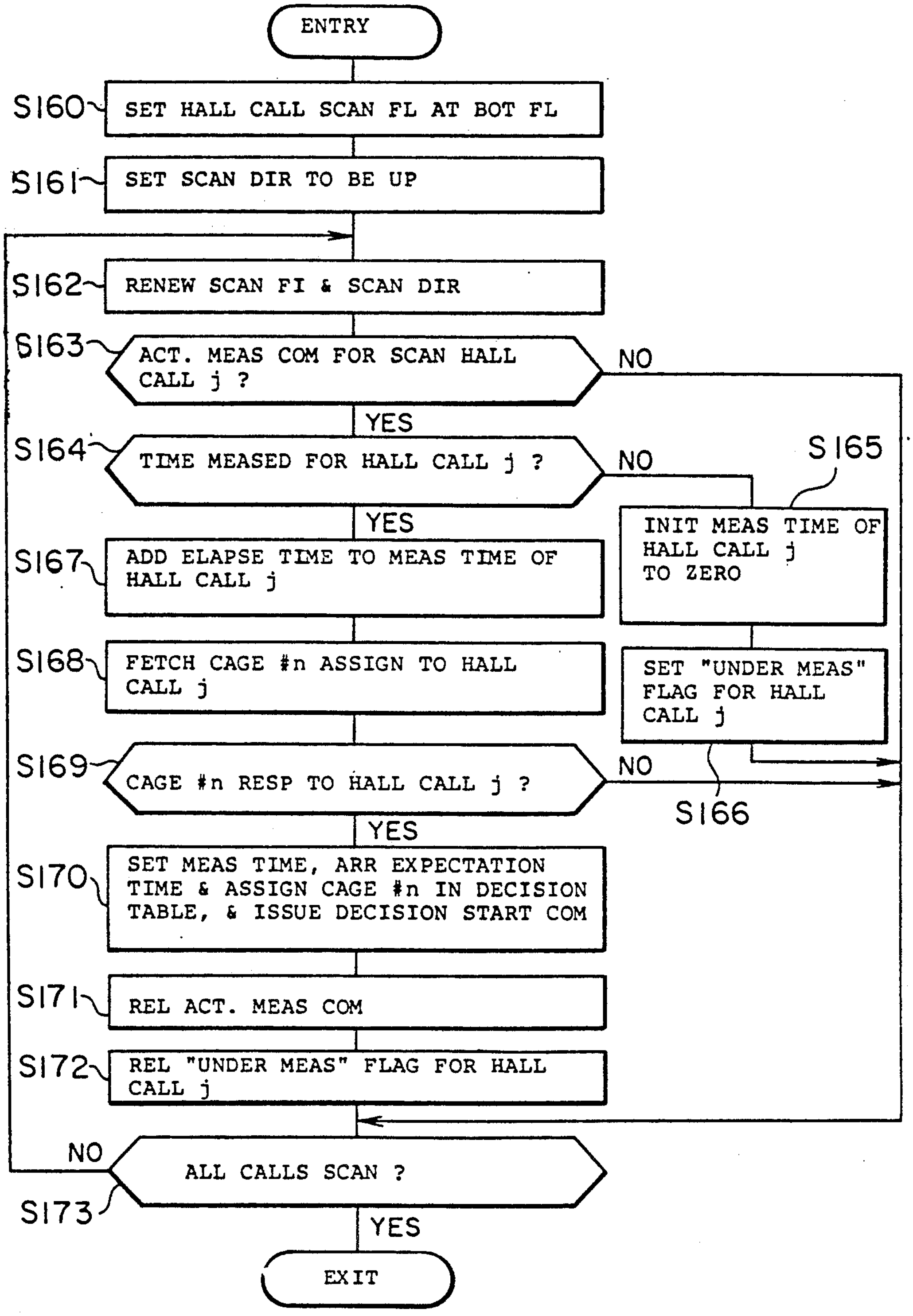

FIG. 15 is a flow chart in which, as an example of a routine for actually measuring the information corresponding to the group-supervisory predictive information held, the routine is performed for the arrival expectation time.

Here, as regards those hall calls at the individual floors and in the individual directions for which actual measurement commands have been respectively issued, the period of time which is taken since the issue of each actual-measurement command till the arrival of the assigned cage is actually measured. Further, the actual measurement value and relevant information are stored in a deciding table. Incidentally, the routine is processed in a task which is cyclically and repeatedly called out at intervals of about 0.1 second.

Referring to FIG. 15, at a step S160, the floor at which scanning is started is set at the bottom floor in order to decide whether or not the actual measurement information items are set in the decision table for all the hall calls. At the next step S161, the scanning direction which indicates the direction of the hall calls to be scanned is set to be up.

At the next step S162, the scanning floor is renewed to renew the hall call to-be-scanned by one. When the top floor has been reached, the scanning direction is set to be down. The hall call being scanned is denoted by j.

At the next step S163, if the command of actually measuring the arrival expectation time is set for the hall call j being scanned is decided. When the actual measurement command is set, the control flow proceeds to a step S164, at which if a time is being measured for the hall call j is decided. Here, when the time is being measured, the control flow is shifted to a step S167. When any time is not being measured, namely, when the actual measurement has been started, the control flow is shifted to a step S165, at which a time measurement memory for the hall call j is cleared (initialized to zero). At the next step S166, an "under measurement" flag is set to indicate the measurement of the hall call j.

At the step S167, a period of time having lapsed since the last processing of this routine is added to the value of the time measurement memory corresponding to the hall call j. Besides, at the next step S168, Cage No. n assigned to the hall call j is fetched, and at the next step S169, if the assigned cage No. n has responded to the hall call j is decided. When the assigned cage No. n has responded to the hall call j, the actual measurement on the hall call j is completed, and the results of the actual measurement are set and stored in the columns of the arrival expectation time-deciding table for the hall call j, at a step S170 as follows:

(1) The previous value of the time measurement memory corresponding to the hall call j is set in the column of the actually measured value.

(2) The arrival expectation time corresponding to the hall call j is fetched from the predictive-information holding table, and is set in the column of the predictive value.

(3) The assigned cage No. of the hall call j in the predictive-information holding table is set in the column of the assigned cage No.

(4) The decision start command of the hall call j is set.

When the set processing at the step S170 has ended, the control flow proceeds to a step S171, at which the arrival expectation time actual-measurement command of the hall call j in the predictive-information holding table is released so as to get ready for the next diagnosis. Further, at the next step S172, the "under measurement" flag is released so as to get ready for the next diagnosis. Besides, at a step S173, if all the hall calls have been scanned is decided. The control flow is ended in the absence of any hall call to-be-scanned.

Figure 16:
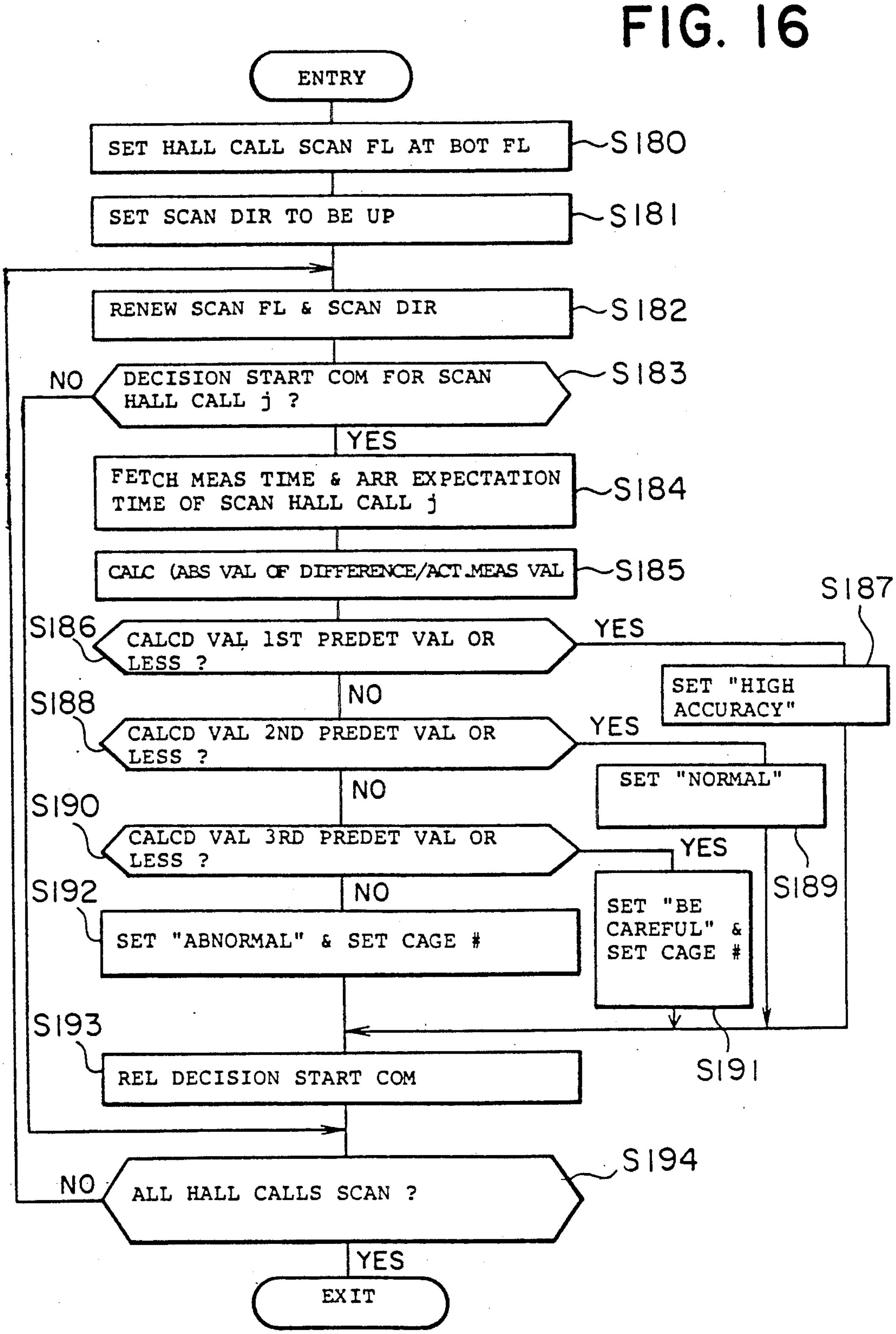

FIG. 16 is a flow chart in which, as an example of a prediction accuracy diagnosis routine wherein the group-supervisory predictive-information value and the actual measurement value corresponding thereto as respectively obtained with the procedures of FIG. 14 and FIG. 15 are compared so as to decide the presence of any abnormality from the difference of both the values and to record a state at that time, the routine is performed for the arrival expectation time.

Here, the arrival expectation time and the actual measurement value set in the decision table for each of the hall calls at the individual floors and in the individual directions are compared, the degree of any abnormality is decided in accordance with the magnitude of the absolute value of the difference of the comparison, and the result of the decision is set and stored in a diagnostic result table. Incidentally, the routine is processed in a task which is cyclically and repeatedly called out at intervals of about 0.1 second.

Referring to FIG. 16, at a step S180, the scanning start floor is first set at the bottom floor in order to decide whether or not all the hall calls are diagnosed. At the next step S181, the scanning direction which indicates the direction of the hall calls to be scanned is set to be up.

At the next step S182, the scanning floor is renewed to renew the hall call to-be-scanned by one. When the top floor has been reached, the scanning direction is set to be down. The hall call being scanned is denoted by j.

At the next step S183, if the command of starting a decision is set for the hall call j being scanned is decided. In the presence of the decision start command, the control flow shifts to a step S184, at which the actual measurement value and the arrival expectation time are fetched from the decision table with respect to the hall call j being scanned. At the next step S185, the rate of discrepancy is obtained from (the absolute value of the difference) ÷(the actual measurement value). When it has been decided at a step S186 that the rate of discrepancy is the first predetermined value (for example, 0.01) or less, the control flow proceeds to a step S187, at which the accuracy is decided to be very high, and "high accuracy" is set in the diagnostic result table. Besides, when it has been decided at the step S186 that the first predetermined value is exceeded, the control flow shifts to a step S188, at which if the rate of discrepancy is the second predetermined value (for example, 0.1) or less is decided. Here, when the rate of discrepancy exceeds the first predetermined value and does not exceed the second predetermined value, the accuracy is decided to involve no special abnormality, and "normal" is set in the diagnostic result table at a step S189.

In addition, the next step S190 decides if the rate of discrepancy exceeds the second predetermined value without exceeding the third predetermined value (for example, 0.5). Subject to "YES", the control flow proceeds to a step S191, at which the accuracy is decided to be inferior, and "be careful" is set in the diagnostic result table. Further, No. of the assigned cage is set for reference in the examination of maintenance staff.

When the step S190 has decided that the third predetermined value is exceeded, the control flow proceeds to a step S192, at which the accuracy is decided to be very inferior, and "abnormal" is set in the diagnostic result table. For reference in the examination, No. of the assigned cage is also set.

At the next step S193, the decision start command is released to get ready for the next diagnosis. Besides, at a step S194, if all the hall calls have been scanned is decided. The control flow is ended in the absence of any hall call to-be-scanned.

In the above, it is assumed that, each time the hall call is registered, the arrival expectation time and the actual measurement value are compared to make the prediction accuracy diagnosis. However, with an expedient in which the differences of the comparisons and Nos. of the assigned cages on those occasions are successively recorded in a plurality of diagnostic result tables and in which the diagnostic result tables are scanned for each of the hall calls at the individual floors and in the individual directions every day by way of example so as to diagnose the degree of any abnormality from the average value of the differences of one day, the possibility of an error contained in the diagnosis lessens, and the reliability of the diagnostic result heightens. With an expedient in which Nos. of the assigned cages corresponding to the hall calls are cumulated and are scanned so as to take the average value of the differences of one day similarly to the above, if abnormalities are partially exhibited by a specified one of the cages, the abnormality of the specified cage can be diagnosed.

Figure 17:
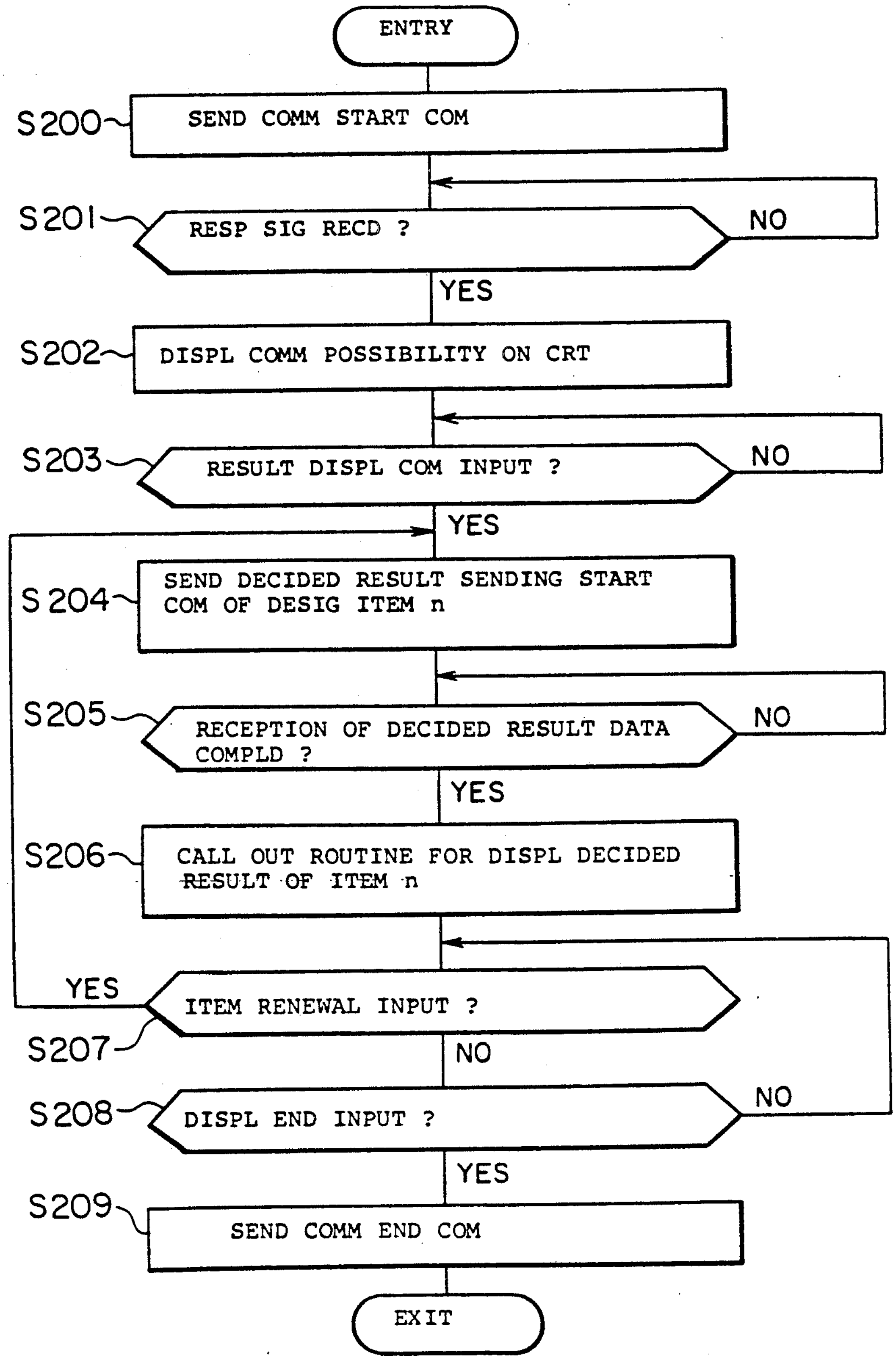

FIG. 17 is a flow chart showing a program procedure in the case an instruction for outputting the self-diagnostic result is controlled by the laptop type personal computer.

In the procedure shown here, the self-diagnostic result output instruction is transferred to the group-supervision control CPU of the elevator system through a serial interface so as to receive the self-diagnostic result and to display the received data. In order to establish a form which is generally handled, the display content of the self-diagnostic result is processed as Item No. n. By way of example, the arrival expectation time, the expectation cage load, etc. correspond to the item Nos.

Referring to FIG. 17, a command for starting communications with the elevator group-supervision control device 9 is sent by operating the laptop type personal computer of the maintenance device 13 (step S200). Thus, if a response signal from each elevator control device 5 has been received is decided (step S201). When the reception of the response signal has been decided, the transfer with the elevator group-supervision control device through the serial interface is started. At the next step S202, "communication start OK" is displayed on the CRT of the personal computer.

At the next step S203, if a result display command and display item No. have been input on the keyboard of the personal computer is decided. When the input of the display item No. (represented by n) has been decided, the control flow proceeds to a step S204, at which a command for sending the decided result data of the item n is sent to the group-supervision control CPU of the elevator system. When the decided result data has been received from the group-supervision control device 9 of the elevator system, a procedure for displaying the decided result on the laptop personal computer is called out in correspondence with the item No. n (steps S205 and S206).

The next step S207 decides whether or not the decided result display item is renewed, from the input of the keyboard, and the next step S208 decides if the display request is ended. At the next step S209, a communication end command is transferred to the group-supervision control device 9 of the elevator system so as to end the communications.

Figure 18:
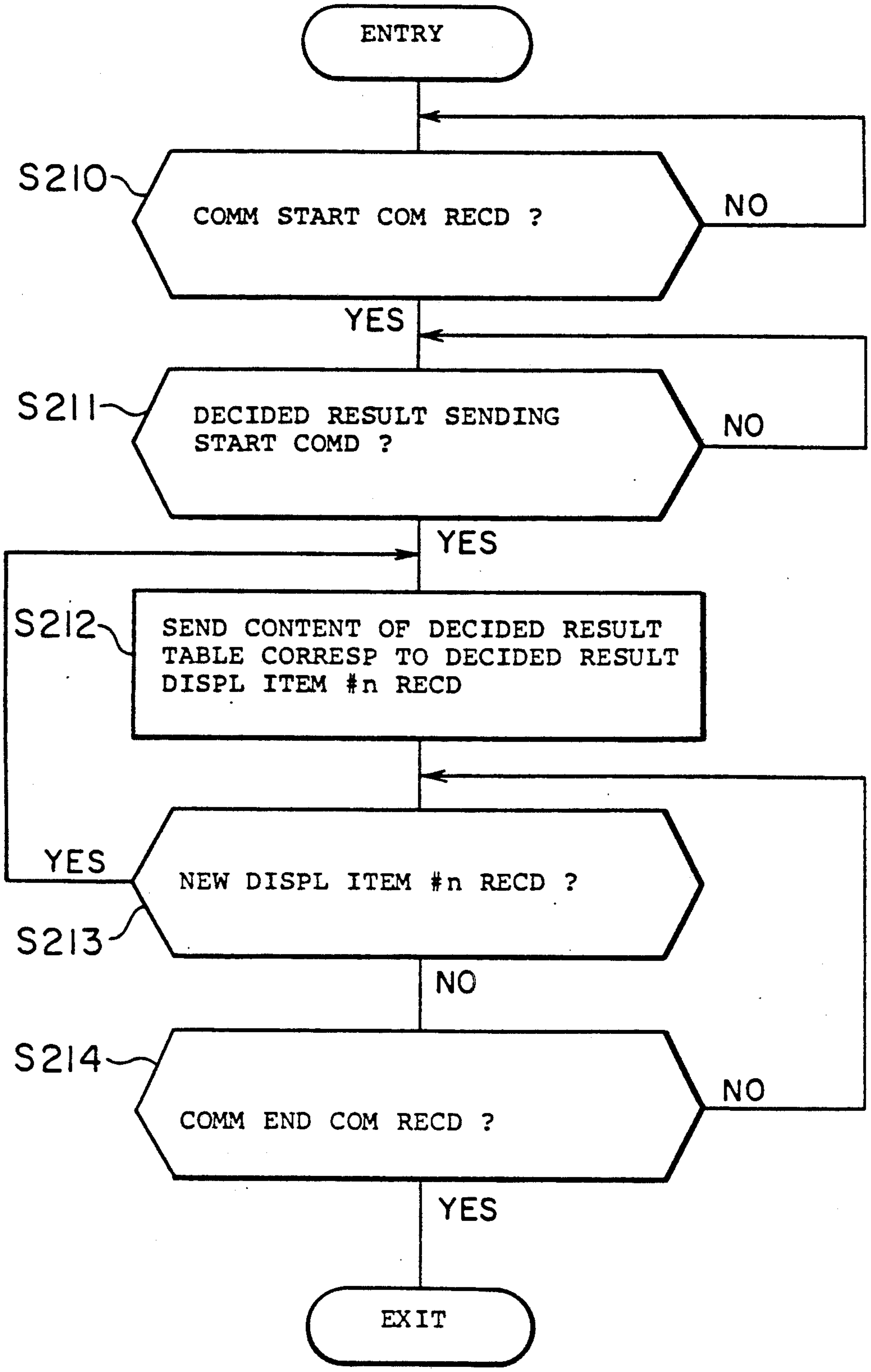

FIG. 18 shows that program on the side of the group-supervision control CPU of the elevator system which corresponds to the self-diagnostic result output processing in FIG. 17. While mating with the program procedure of the laptop type personal computer in FIG. 17, the program in FIG. 18 sends the display content of the self-diagnostic result conforming to the output instruction of the personal computer.

Here, the display content of the self-diagnostic result corresponding to the item No. designated by the self-diagnostic result output instruction is sent to the laptop type personal computer through a serial interface.

Referring to FIG. 18, the first step S210 decides if a communication start command has been received from the personal computer. When the communication start command has been received, the processing is started. Besides, when a decided result sending start command has been received at the next step S211, the control flow shifts to a step S212, at which the content of the decided result table corresponding to the decided result display item No. n is sent.

At the next steps S213 and S214, the content of the decided result table is sent to the personal computer. Thereafter, the next instruction is awaited, and the next processing is executed according to the instruction. That is, when a new display item is received, the content of the decided result table corresponding to the received item No. is sent again. When a communication end command is received, the processing is ended.

Figure 19:
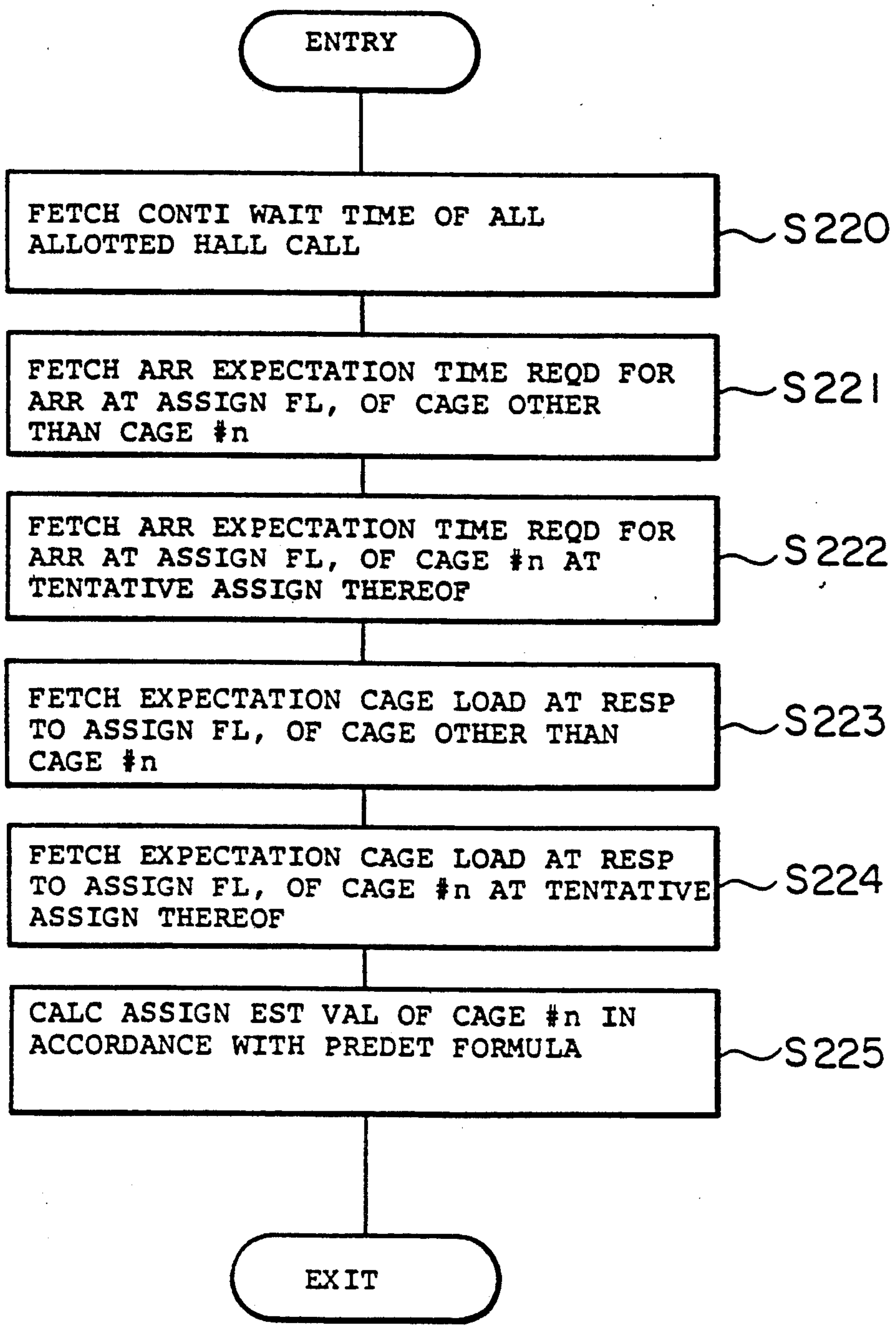
FIG. 19 is a flow chart in the case where the processing of FIG. 3 is altered and then applied in the second embodiment.
Figure 20:
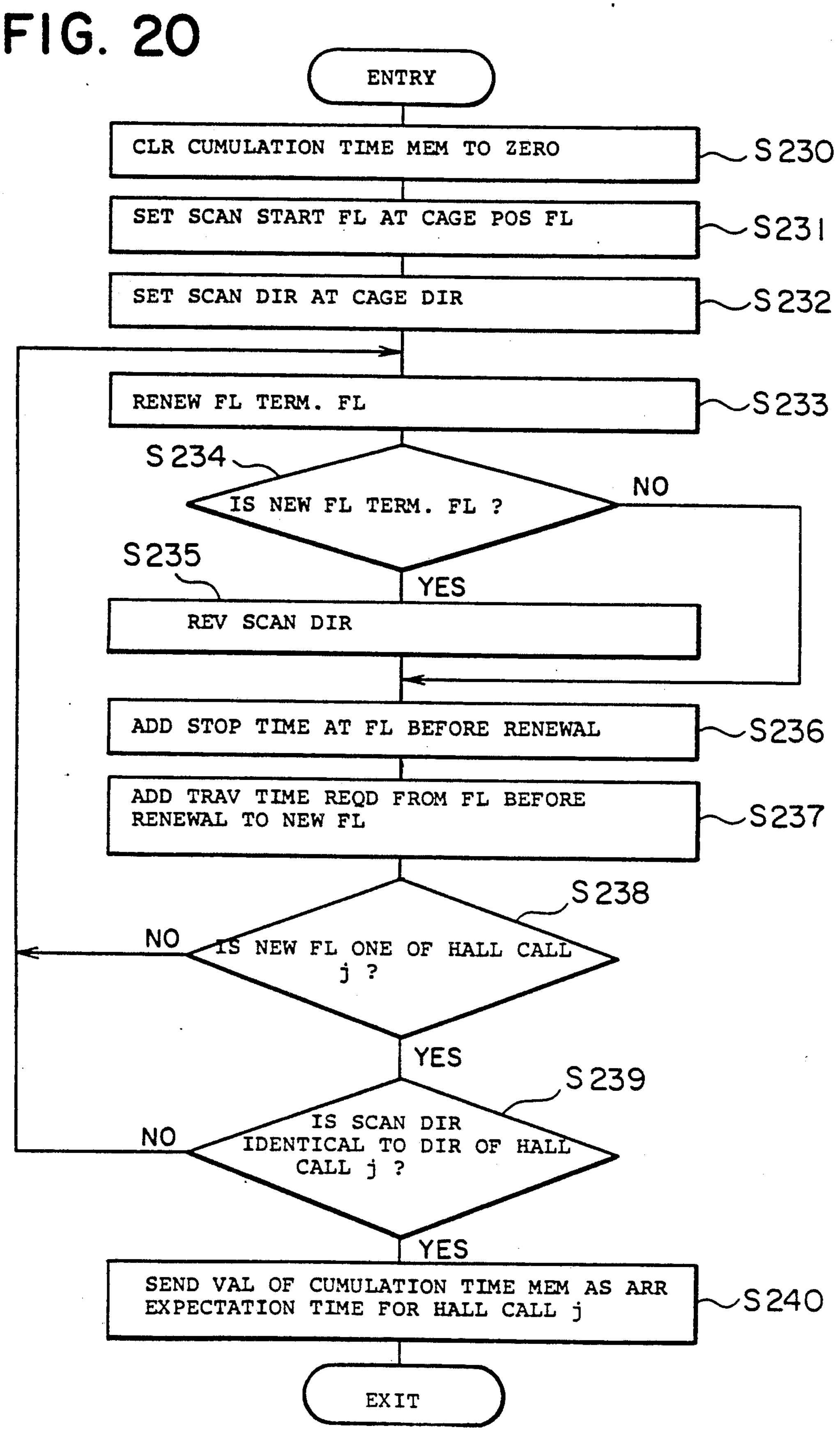
FIG. 20 is a flow chart in the case where the processing of FIG. 11 is altered and then applied in the second embodiment.

FIGS. 19 and 20 show another embodiment, in which the flow charts of FIG. 2 and FIGS. 14–18 are used as they are. FIG. 19 is a flow chart corresponding to FIG. 3, while FIG. 20 is a flow chart corresponding to FIG. 4.

This embodiment is applied to the construction of a system in which group-supervisory predictive information for a group supervision control is calculated by elevator control means realized by the CPU of an elevator control device and is transferred to elevator group-supervision control means so as to perform group-supervision control processing.

Figure 3:
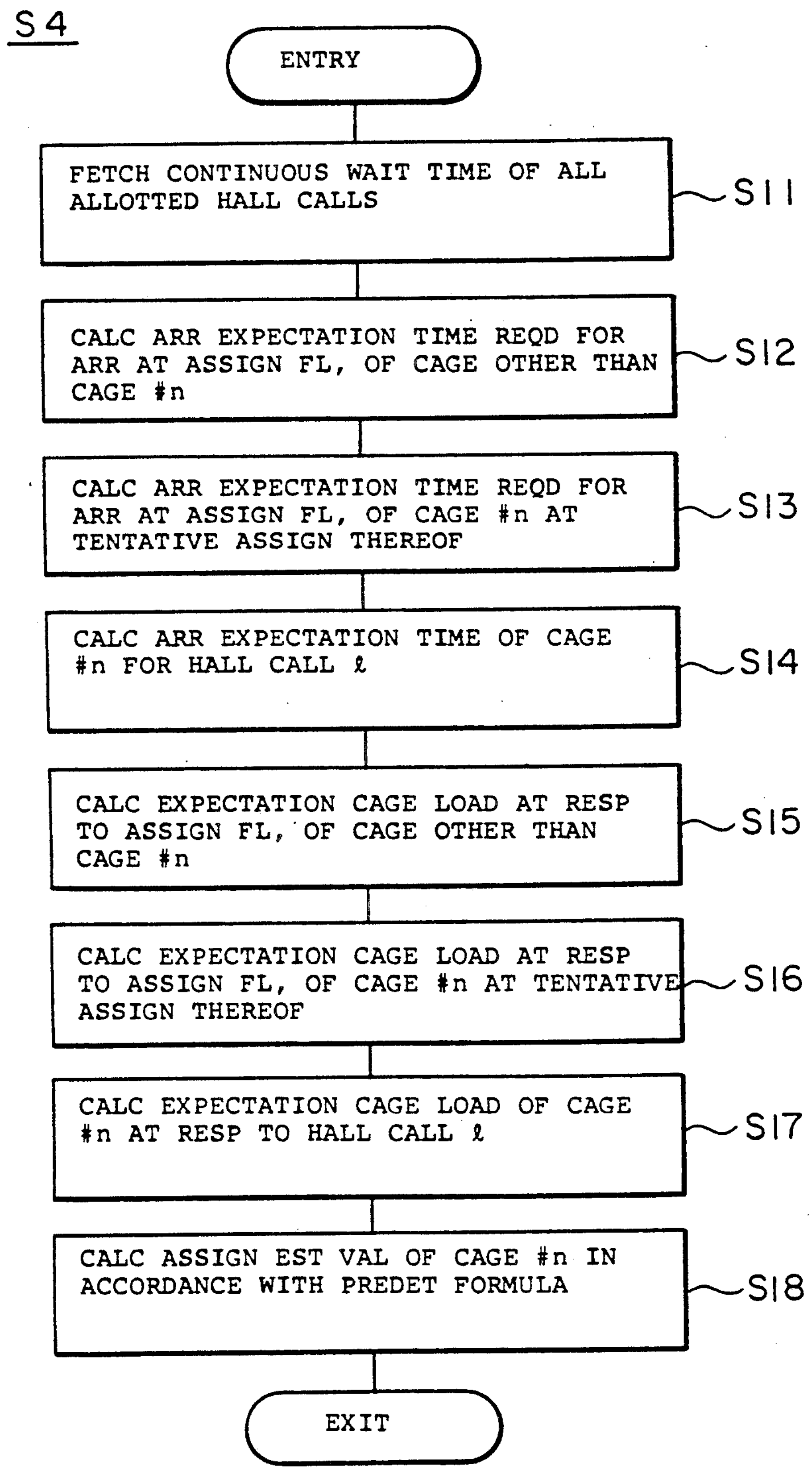
FIG. 3 PRIOR ART

In FIG. 19, the processing corresponding to that of FIG. 3 is altered in order to use the predictive information from the elevator control means.

The procedure illustrated here calculates the assignment estimation value on the basis of the predictive information items calculated by the elevator control means of the respective cages and transferred to the elevator group-supervision control means. For the tentatively assigned cage No. n, the predictive information in the case of assuming the allotment of the selected hall call l is used among the received predictive information items, and for any cage other than the tentatively assigned cage No. n, the predictive information in the case of making no tentative allotment is used among the received predictive information items.

Referring to FIG. 19, at a step S220, the continuous wait times of the already allotted hall calls among the registered hall calls, the times having lapsed up to the present since the registrations, are fetched. (The continuous wait times have been separately obtained by tasks such as timer interrupts.)

At a step S221, as to those cages other than Cage No. n which are not tentatively assigned, the arrival expectation times till the responses to the allotted hall calls received from the respective cages are fetched.

At a step S222, as to Cage No. n to which the hall call l is tentatively allotted, the arrival expectation times for responding to the tentatively allotted hall call l and the already allotted hall call received from Cage No. n are fetched.

At a step S223, as to those cages other than Cage No. n which are not tentatively assigned, the predictive cage loads at the responses to the allotted hall calls received from the respective cages are fetched.

At a step S224, as to Cage No. n to which the hall call l is tentatively allotted, the predictive cage loads at the responses of Cage No. n to the already allotted hall call and the tentatively allotted hall call l are fetched.

At a step S225, the assignment estimation value in the case of tentatively assigning Cage No. n to the hall call l is calculated in accordance with a predetermined formula.

Figure 4:
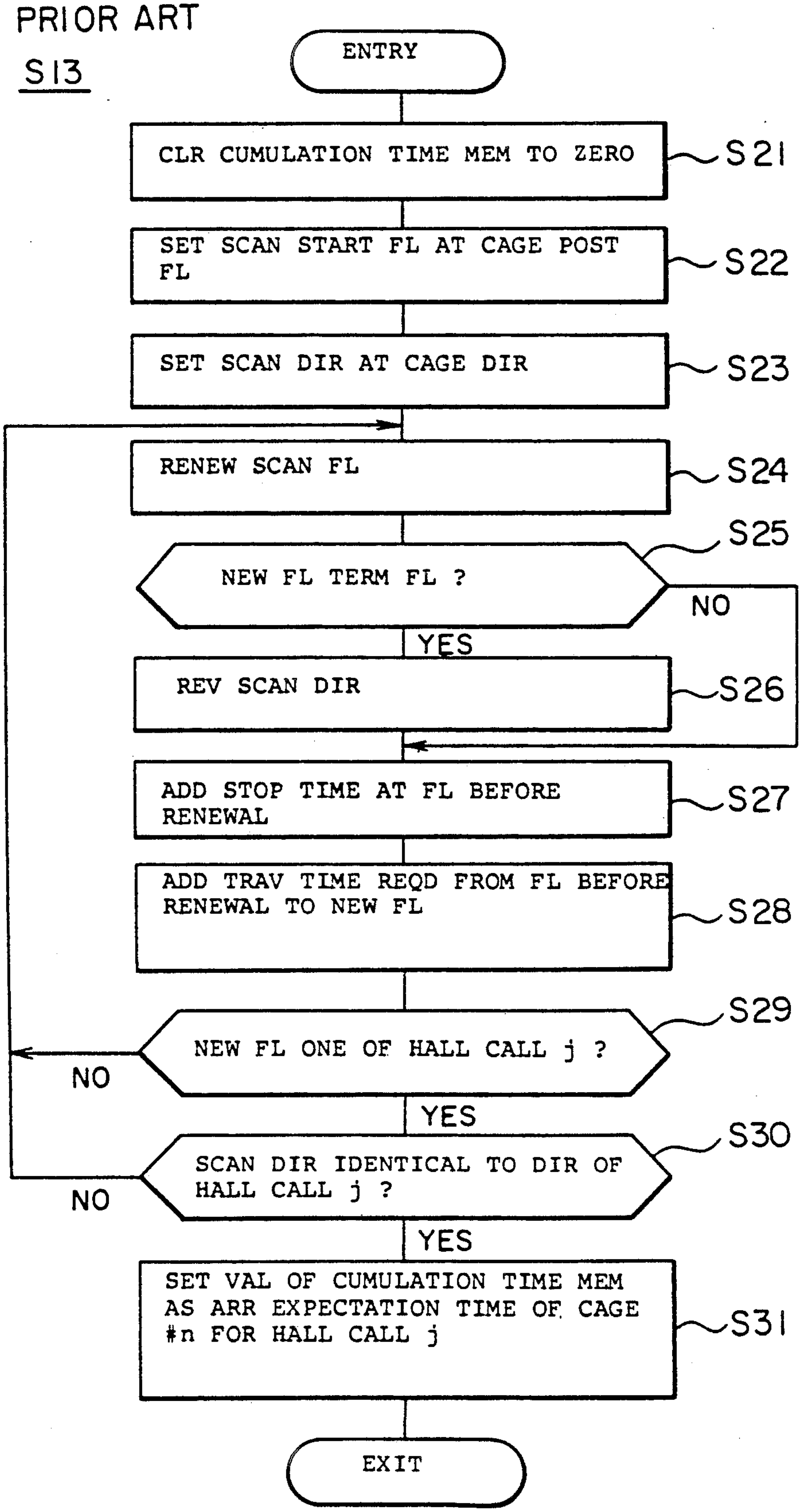
FIG. 4 PRIOR ART

In FIG. 20, the processing corresponding to that of FIG. 4 is altered so as to be executed by the elevator control means.

Referring to FIG. 20, at a step S230, the initial value of a storing memory for successively computing passage times at respective floors and cumulatively adding them is cleared to zero. Further, at the next step S231, the floor at which scanning is started is set at the floor at which the cage lies presently, and at the next step S232, the scanning direction which indicates whether the scanning is done upwards or downwards, is initialized to be identical to the direction in which the cage is presently serving.

At the next step S233, the scanning floor is renewed by one. At the ensuing steps, a period of time required from the previous floor to the new floor is predictively obtained, and it is added to the value of the cumulation time memory.

More specifically, the step S234 decides if the new floor is the terminal floor of the top floor or the bottom floor. When the new floor is the terminal floor, the control flow proceeds to the step S235, at which the scanning direction is reversed for the next scanning. At the next step S236, a stop time at the floor before the renewal is predicted and is added to the value of the cumulation time memory as in the case of FIG. 4.

At the next step S237, the period of time which is required for the cage to arrive at the new floor from the floor before the renewal is predicted from an inter-floor distance table and the predictive travel pattern of the cage, and it is added to the value of the cumulation time memory.

At the next step S238, if the new floor is the floor of the hall call j is decided. Subject to "YES", the control flow shifts to a step S239, which decides if the new floor and the scanning direction are identical to those of the hall call j. When they are identical, the control flow proceeds to a step S240, at which the scanning of the floors is ended, and the value of the cumulation time memory is sent as the arrival prediction time of Cage No. n for the hall call j. On the other hand, when the scanning does not reach the hall call j at the step S238, the control flow returns to the step S233, at which the floor is renewed, and the processing of the step S234, et seq. is repeatedly executed.

Also in the embodiment described above, trouble can be self-diagnosed by diagnosing the accuracy of the group-supervision predictive information. Especially in such a case, the abnormality of a place where the predictive information is generated becomes definite.

In the foregoing embodiments, it has been indicated that the arrival expectation time and the expectation cage load are held as the group-supervisory predictive information. However, other items of group-supervisory predictive information, for example, a predictive wait time, a predictive hall call registration rate at each floor, and predictive getting-on and -off numbers at each floor are also applicable, and the accuracy of predictive information statistically obtained can also be diagnosed.

Although, in the foregoing embodiments, the device for outputting the self-diagnostic result has been the maintenance device, it may well be the monitoring device of the elevator system for informing a building caretaker of the result or may well be a centralized monitoring device which is connected through the telephone line or the like of a maintenance company or the like. When the result is output to the monitoring device of the elevator system or the centralized monitoring device of the maintenance company or the like, any trouble may be repaired quickly.

As thus far described, according to this embodiment, group-supervisory predictive information generated and an information value corresponding thereto and obtained by an actual measurement are compared, thereby to self-diagnose an elevator system. Therefore, even phenomena which appear as only misses in prediction accuracies on account of the erroneous selection of specifications, the erroneous distribution of devices and equipments, and the change of building traffic or the trouble of any device can be precisely diagnosed.

What is claimed is:

1. A group-supervision control apparatus for an elevator system comprising:

a microprocessor including memory having stored control programs providing group-supervision control of elevator cages including selecting cages from among a plurality of cages, in response to signals from hall call buttons for calling the cages and destination call buttons and on the basis of control information including calculated predictive-information values, and causing the selected cages to travel to destination floors; and an elevator operation testing apparatus having a processor and memory including stored simulation test operation programs which direct the cages to execute test operations that simulate normal operations of the cages under group-supervision control, said testing apparatus providing:

group-supervisory predictive-information holding means for selecting and holding group-supervisory predictive-information values generated during an executed test operation under group-supervision control;

group-supervisory information actual-measurement means for measuring actual values which correspond to predictive values held in said group-supervisory predictive-information holding means; and predictive-information accuracy diagnostic means for comparing held predictive values and corresponding measured actual values and for obtaining diagnostic results representing the presence of an abnormality revealed by the comparing.

2. A group-supervision control apparatus for an elevator system comprising:

a microprocessor including memory having stored control programs providing group-supervision control of elevator cages including selecting cages from among a plurality of cages, in response to signals from hall call buttons for calling the cages and destination call buttons and on the basis of control information including calculated predictive-information values, and causing the selected cages to travel to destination floors; and said memory including stored simulation test operation programs which direct the cages to execute test operations that simulate normal operations of the cages under group-supervision control, said stored simulation test operation programs providing:

group-supervisory predictive-information holding means for selecting and holding group-supervisory predictive-information values generated during an executed operation under group-supervision control;

group-supervisory information actual-measurement means for measuring actual values which correspond to predictive values held in said group-supervisory predictive-information holding means; and predictive-information accuracy diagnostic means for comparing held predictive values and corresponding measured actual values and for obtaining diagnostic results representing the presence of an abnormality revealed by the comparing.

* * * * *